United States Patent [19]
Horii et al.

[11] Patent Number: 6,066,590
[45] Date of Patent: May 23, 2000

[54] HARMFUL GAS REMOVING AGENT

[75] Inventors: Yuji Horii; Toshinori Inoue; Takeshi Yamashita, all of Kobe; Hidetaka Shibano; Yoshiyuki Tomiyama, both of Fuchu-machi; Kimihiko Yoshizaki, Chiyoda-ku, all of Japan

[73] Assignee: Sued-Chemie Nissan Catalysts Inc., Tokyo-to, Japan

[21] Appl. No.: 09/043,581

[22] PCT Filed: Sep. 26, 1996

[86] PCT No.: PCT/JP96/02792

§ 371 Date: Mar. 26, 1998

§ 102(e) Date: Mar. 26, 1998

[87] PCT Pub. No.: WO97/11779

PCT Pub. Date: Apr. 3, 1997

[30] Foreign Application Priority Data

Sep. 26, 1995 [JP] Japan .................................. 7-247454

[51] Int. Cl.[7] .............................. B01J 23/00; B01J 8/02; B01J 8/00; C01G 3/02; C01G 45/02
[52] U.S. Cl. ..................... 502/324; 502/326; 502/330; 502/331; 502/338; 502/345; 423/213.5; 423/239.1; 423/604; 423/605
[58] Field of Search .................................. 423/600, 604, 423/605, 636, 637, 213.5, 239.1; 502/300, 317, 318, 325, 326, 324, 330, 331, 328, 345

[56] References Cited

U.S. PATENT DOCUMENTS

| | | | |
|---|---|---|---|
| 3,865,923 | 2/1975 | Stephens | 423/213.2 |
| 3,907,968 | 9/1975 | Kobylinski et al. | 423/213.5 |
| 3,972,837 | 8/1976 | Acres et al. | 252/473 |
| 4,190,556 | 2/1980 | Grasselli et al. | 252/432 |
| 4,206,134 | 6/1980 | Kugler et al. | 260/449 R |
| 4,289,591 | 9/1981 | Davidson et al. | 204/129 |
| 4,521,530 | 6/1985 | Zackay et al. | |
| 4,543,174 | 9/1985 | Beer et al. | 204/290 R |
| 4,677,237 | 6/1987 | Imai et al. | 585/444 |
| 4,740,492 | 4/1988 | Dyke | 502/304 |
| 4,764,498 | 8/1988 | Wissner et al. | 502/251 |
| 5,208,202 | 5/1993 | Muramatsu et al. | 502/302 |
| 5,380,692 | 1/1995 | Nakatsuji et al. | 502/303 |
| 5,504,053 | 4/1996 | Chou et al. | 502/348 |
| 5,610,117 | 3/1997 | Horiuchi et al. | 502/324 |
| 5,677,254 | 10/1997 | Nojima et al. | 502/65 |
| 5,698,715 | 12/1997 | Schroeder et al. | 549/346 |

FOREIGN PATENT DOCUMENTS

| | | |
|---|---|---|
| 60-7942 | 1/1985 | Japan . |
| 63-33419 | 7/1988 | Japan . |
| 4-367707 | 12/1992 | Japan . |
| 5-123568 | 5/1993 | Japan . |
| 5-154339 | 6/1993 | Japan . |
| 5-253474 | 10/1993 | Japan . |
| 6-26671 | 4/1994 | Japan . |
| 6-154601 | 6/1994 | Japan . |
| 7-88363 | 4/1995 | Japan . |
| 7-246335 | 9/1995 | Japan . |
| 8-10619 | 1/1996 | Japan . |
| 8-173796 | 7/1996 | Japan . |

*Primary Examiner*—Steven P. Griffin
*Assistant Examiner*—Cam N. Nguyen
*Attorney, Agent, or Firm*—Oblon, Spivak, McClelland, Maier & Neustadt, P.C.

[57] ABSTRACT

The present invention is directed to a harmful gas removing agent used for removing harmful gas such as CO, $NO_x$, and $O_3$ from exhaust gases ventilated from automobile tunnels and underground parking, thereby preventing air pollution. The harmful gas removing agent, solving the problems of the conventional adsorbents and catalysts, is capable of efficiently removing $NO_x$ with no need of pre-treatment of adding $O_3$ to the exhaust gas being treated, as well as being capable of satisfactorily removing CO and $O_3$ from exhaust gases even at high humidity, and its removing activity lasts for a long time. Furthermore, the harmful gas removing agent can be regenerated by being exposed to hot air at relatively low temperature, thereby being repeatedly used, and is hard to be poisoned by $SO_x$ contained in the exhaust gas. The harmful gas removing agent includes, as effective components, a manganese oxide having a specific average manganese oxidation number, a manganese-copper compound oxide or a manganese-iron compound oxide, and a ruthenium compound, or in addition thereto an alkali metal compound.

18 Claims, No Drawings

HARMFUL GAS REMOVING AGENT

This application is the National Stage, filed under 35 U.S.C. 371, of International Application No. PCT/JP96/02792, filed Sep. 26, 1996, now WO97/11779.

TECHNICAL FIELD

The present invention relates to a harmful gas removing agent used for removing harmful gas including nitrogen oxides ($NO_x$) such as nitrogen monoxide (NO), nitrogen dioxide ($NO_2$), carbon monoxide (CO), and ozone ($O_3$) contained in exhaust gases ventilated from motor tunnels, underground parking and the like to prevent air pollution.

BACKGROUND ART

Exhaust gases ventilated from motor tunnels, underground parking, and indoor spaces equipped with apparatus which produces harmful gases, are largely different from flue gases ventilated from incineration apparatus in that exhaust gases have normal temperature and low $NO_x$ concentration, and the $NO_x$ concentration drastically varies in an instant. Flue gases have been treated by a selective catalytic reduction process ($NH_3$ reductive denitration process) for removing $NO_x$ therefrom. In the selective catalytic reduction process, $NO_x$ is reduced to nitrogen ($N_2$) using ammonia ($NH_3$) as a reducing agent with a presence of titania ($TiO_2$) as a catalyst. However, the selective catalytic reduction process is not directly applicable for removing $NO_x$ from exhaust gases. For this reason, it has been considered that for the exhaust gas, after the $NO_x$ concentration is increased by passing the exhaust gas through an appropriate $NO_x$ adsorbent to adsorb $NO_x$ and heating and desorbing the adsorbent, the aforementioned $NH_3$ reductive denitration process is adopted. The following adsorbents have been known as $NO_x$ adsorbents used for the process.

1) Activated alumina ($Al_2O_3$) type $NO_x$ adsorbent (disclosed in Japanese Unexamined Patent Publication No. 4-367707). This adsorbent includes oxides of sodium and calcium, and in addition thereto oxides of manganese, iron or copper, thereby having an enhanced gas adsorption ability.

2) Low-concentration $NO_x$ adsorbent (disclosed in Japanese Unexamined Patent Publication No. 5-123568). This adsorbent includes anatase-type $TiO_2$, used as a carrier, and ruthenium supported on the anatase-type $TiO_2$.

3) An adsorbent for $NO_x$, and especially $NO_2$ (disclosed in Japanese Unexamined Patent Publication No. 7-88363). This adsorbent includes a carrier, and at least one precious metal selected from the group consisting of platinum, gold, ruthenium, rhodium, and palladium or a compound thereof, and if necessary, a metallic oxide of metals such as manganese, iron, cobalt, nickel, copper, and zinc supported on the carrier.

4) An $NO_x$ oxidizing and adsorbing agent (disclosed in Japanese Unexamined Patent Publication No. 8-173796). This agent contains $\gamma$-$MnO_{2-x}$ (where $0 \leq x \leq 0.1$) having a specific surface area of 100 $m^2/g$ or more as a main component.

On the other hand, examples of known catalysts conventionally used for oxidizing CO into $CO_2$ at normal temperature include a metallic oxide containing a copper oxide and a manganese oxide in a mixed state as main components (hopcalite catalyst), activated charcoal including platinum or palladium, and alumina. Also known as catalysts are a mixture of palladium or a compound thereof and activated manganese dioxide (Japanese Examined Patent Publication No. 63-33419), and a catalyst which includes alumina, and palladium salt, copper salt, and nickel salt supported on the alumina (Japanese Unexamined Patent Publication No. 60-7942).

Examples of known $O_3$ removing agent capable of removing $O_3$ at normal temperature include a catalyst containing a manganese oxide or a nickel oxide and an aluminum oxide as active ingredients (Japanese Unexamined Patent Publication No. 6-154601), a manganese dioxide catalyst (Japanese Unexamined Patent Publication No. 7-246335), a catalyst which includes a composite silica·boria·alumina, amorphous manganese oxide and amorphous palladium oxide supported on the compound oxide, and preferably further containing oxide of silver, iridium, rare-earth metals and/or transition metals (Japanese Unexamined Patent Publication No. 8-10619).

Examples of known catalyst capable of simultaneously removing CO and $O_3$ at normal temperature include a molded product containing transition metal such as iron, nickel, copper and manganese or oxides thereof as catalytic activation ingredients (Japanese Examined Patent Publication No. 6-26671).

However, the aforementioned conventional $NO_x$ adsorbents 1) to 3) have the following problems.

Although the adsorbent 1) is intended for use in adsorbing $NO_x$, it actually is capable of adsorbing $NO_2$ only. In many cases, NO forms the most part of the total $NO_x$ concentration and $NO_2$ forms only several to 10 percent. Therefore, prior to treatment, it is necessary to add ozone ($O_3$) to the exhaust gas being treated to oxidize NO into $NO_2$. If the amount of added $O_3$ is not sufficient, unoxidized NO remains without being adsorbed. Contrary to this, if the amount of added $O_3$ is too much, the excessive $O_3$, which does not react with NO, remains as harmful gas. There is also a fear that $O_3$ may leak from the exhaust gas treatment apparatus, regardless of the amount of $O_3$ added. In addition, the adsorbent 1) after adsorbing $NO_x$ requires to be heated at temperature as high as 450° C. in order to desorb $NO_x$.

Although the adsorbent 2) is intended for used in adsorbing $NO_x$, there is no clear description as to the adsorbing abilities of NO and $NO_2$ respectively. Therefore, its ability of adsorbing NO is not definitive. In addition, the adsorbent 2) after adsorbing $NO_x$ also requires to be heated at temperature as high as 350° C. in order to desorb $NO_x$.

Although the adsorbent 3) is intended for use in adsorbing $NO_x$. However, its ability of adsorbing NO is remarkably poorer than that of adsorbing $NO_2$ (and its ability of adsorbing NO lasts for only a short time). Therefore, the adsorbent 3) requires to add $O_3$ to the exhaust gas to oxidize NO into $NO_2$, as is the case of the adsorbent 1), It is required to oxidize NO into $NO_2$ by adding $O_3$ to the exhaust gas; otherwise, $NO_x$ cannot be adsorbed sufficiently. In most cases, exhaust gases have an $NO_2$ concentration lower than NO concentration. However, if a large amount of NO in the exhaust gas being treated is oxidized into $NO_2$, there is a fear that only some part of $NO_2$ is adsorbed by the adsorbent, while the rest $NO_2$ is not adsorbed by an adsorbent, and the ventilated exhaust gas may have the $NO_2$ concentration remaining unchanged or conversely increased exceeding the value regulated by the Environmental quality standard. Due to such disadvantages, the adsorbents 1) to 3) are not preferable..

Furthermore, in many cases, exhaust gases ventilated from automobile tunnels and underground parking also contain sulfur oxide ($SO_x$) such as sulfur dioxide ($SO_2$) and sulfur trioxide ($SO_3$). The concentration of $SO_x$ is generally lower than that of $NO_x$. However, $SO_x$ generally reacts with various kinds of metals to produce accumulative sulfur compound (such as sulfate), and the adsorbents 1), 2), and 3) contains metals as main components easy to react with sulfur to produce sulfur compound, such as heavy metal oxide, activated alumina, and ruthenium compound. Thus-produced sulfur compound may cause deterioration of the harmful gas adsorbing ability of the adsorbents (i.e., the adsorbents are poisoned by the sulfur compound).

In the case of employing the adsorbent 4), a large part of NO is oxidized into $NO_2$ which is then discharged. The adsorbent (4) adsorbs only a part of NO. Therefore, it is necessary to additionally provide an $NO_2$ adsorbent on the downstream of the adsorbent (4). Accordingly, as is the cases of employing the adsorbents 1) and 3), $NO_x$ cannot be sufficiently removed unless remarkably enhanced $NO_x$ adsorbing ability is given to the adsorbent 4).

Furthermore, the hopcalite catalyst, known as a catalyst used for removing CO, exhibits CO removing activity at normal temperature only for a short time, especially in the presence of humidity. Therefore, hopcalite catalyst requires anti-humidity treatment when stored and a drying treatment prior to be used. In addition, a catalyst having a carrier supporting metals such as platinum and palladium is easily poisoned by CO, because platinum and palladium powerfully adsorb CO at normal temperature. In order to avoid this problem, such a catalyst is heated at a temperature of 100° C. or higher, or is subjected to treatment for increasing platinum or palladium concentration to several mass percent. However, there treatments require high cost.

Japanese Examined Patent Publication No. 63-33419 discloses a catalyst including active manganese dioxide. With active manganese dioxide, the catalyst has higher CO removing ability than the catalyst including an inactivate carrier and a platinum compound or a palladium compound supported on the carrier. However, its ability of removing CO is still insufficient at normal temperature, especially in the presence of moisture.

Japanese Unexamined Patent Publication No. 60-7942 discloses a catalyst used for removing CO. However, this catalyst is applicable to an exhaust gas containing CO having a concentration of about 100 ppm or lower. This is because palladium salt, contained in the catalyst, is reduced to a metallic palladium in the presence of CO having high concentration. In addition, the catalyst requires humidity in order to keep its sufficient CO removing ability.

Japanese Unexamined Patent Publication Nos. 6-154601, 7-246335, and 8-10619 respectively disclose a catalyst used for removing $O_3$. The catalyst has a problem that its $O_3$ removing activity lasts only for a very short time especially at high humidity. Japanese Examined Patent Publication No. 6-26671 discloses a catalyst used for removing CO and $O_3$. Although this catalyst is capable of removing both CO and $O_3$, the removing activity lasts only for a short time especially at high humidity, and this tendency is remarkable for CO removal.

DISCLOSURE OF THE INVENTION

In view of the aforementioned problems residing in the prior art, it is an object of the present invention to provide a harmful gas removing agent used for removing harmful gases such as NOx, CO, and $O_3$ from exhaust gases. The harmful gas removing agent is capable of efficiently removing $NO_x$ from the exhaust gas being treated with no need to add $O_3$ to the exhaust gas prior to the treatment. In addition, the harmful gas removing agent is capable of efficiently removing CO and $O_3$ even at high humidity. Its removing activity lasts for a long time. Furthermore, the harmful gas removing agent is regenerated by being exposed to hot air at relatively low temperature, thereby being repeatedly used, and in addition, is hard to be poisoned by $SO_x$ contained in the exhaust gas being treated.

According to a first aspect of the present invention, a harmful gas removing agent includes a manganese-copper oxide and/or a manganese-iron compound oxide, and a ruthenium compound. In the case of including a manganese-copper compound oxide, the preferable mass ratio of [Mn/(Mn+Cu)] is 0.15 or more, and more preferably 0.45 to 0.95. In the case of including a manganese-iron compound oxide, the preferable mass ratio of [Mn/(Mn+Fe)] is 0.1 or more, and more preferably 0.3 to 0.9. Preferably, the manganese-copper oxide compound oxide and manganese-iron compound oxide respectively have a specific surface area of 70 $m^2/g$ or more.

According to a second aspect of the present invention, a harmful gas removing agent includes at least one oxide selected from the group consisting of a manganese oxide, a manganese-copper compound oxide, and a manganese-iron compound oxide, a ruthenium compound, and an alkali metal compound or a tin compound. Especially preferable as an alkali metal compound is a potassium compound. In the case where an alkali metal compound is included, its preferable content out of the entire removing agent is 0.1 to 6.0 mass percent converted to alkali metal. In the case where a tin compound is included, its preferable content out of the entire removing agent is 0.05 to 5.0 mass percent converted to tin.

According to the first and second aspects of the present invention, the preferable average manganese oxidation number of the respective manganese oxide, the manganese-copper compound oxide, or the manganese-iron compound oxide as an essential component is 3.5 to 3.9, and more preferably 3.5 to 3.8. Especially preferable as a ruthenium compound is ruthenium chloride.

According to a third aspect of the present invention, the harmful gas removing agent includes a manganese oxide and a ruthenium compound. The manganese oxide preferably has an average manganese oxidation number of 3.5 to 3.9, and more preferably 3.5 to 3.8. The preferable specific surface area of the manganese oxide is 70 $m^2/g$ or more.

BEST MODE FOR CARRYING OUT THE INVENTION

Hereinafter, the harmful gas removing agent including a manganese oxide and a ruthenium compound as essential components according to the present invention will be described. The manganese oxide preferably has an average manganese oxidation number of 3.5 to 3.9. The harmful gas removing agent can be produced by methods such as impregnation and kneading. When impregnation method is employed, for example, a powdered manganese oxide having an average manganese oxidation number of 3.5 to 3.9 is impregnated with a ruthenium chloride solution, and the resultant is dried. In the actual applications, the harmful gas removing agent is charged into exhaust gas treatment apparatus, and the exhaust gas being treated are passed through the removing agent to remove $NO_x$ such as NO and $NO_2$, CO, $O_3$ and the like therefrom.

In removing $NO_x$, the removing agent requires no pretreatment for adding $O_3$ to the exhaust gas being treated. As the removing agent includes a manganese oxide having a specific oxidation number, it can oxidize NO into $NO_2$ at normal temperature and adsorbs $NO_2$; however, its $NO_2$ adsorbing ability is insufficient especially at high humidity. This disadvantage has been overcome by adding ruthenium compound. As the removing agent includes a ruthenium compound together with the manganese oxide, its $NO_2$ adsorbing and removing activity is remarkably improved. With this arrangement, there is less or no need to provide another $NO_2$ adsorbing agent (such as activated charcoal and hydrophobic zeolite) on the downstream of the portion where NO is oxidized into $NO_2$.

It is supposed from the ultraviolet visible adsorption spectrum and infrared adsorption spectrum of the material extracted from the removing agent after $NO_x$ removal (adsorption) that such effects of ruthenium compounds is caused by production of nitrosyl complex. As described in the "Advanced Inorganic Chemistry" (second half volume) written by Cotton and Wilkinson, issued by Baifuukan (1973) on page 894, a ruthenium compound easily produces nitrosyl complex. Coexistence of ruthenium and nitric acid produces nitrosyl complex. In production of nitrosyl complex, it is essential that NO is oxidized into $NO_2$, and then reacts with water present in the air to produce nitrate ion ($NO_3^-$). If it is assumed that a difference in the removal amount (adsorption amount) due to the presence and absence of ruthenium compound is caused by production of nitrosyl complex, ten molecules of NO (or a substance derived from NO) should be held at maximum per ruthenium atom. This is not logical because nitrosyl complex from ruthenium cannot hold more than six molecules of NO (or a substance derived from NO) per ruthenium atom. Accordingly, it can be seen that the $NO_x$ removal effect remarkably increases because the manganese oxide itself has an increased ability of oxidizing or adsorbing NO in the presence of ruthenium compound.

In order to make the effect of the ruthenium compound effective, it is essential that manganese oxide has the ability of oxidizing NO into $NO_2$ at normal temperature. However, this does not means that any manganese oxide is useable. The present inventors have tried various manganese oxides and checked their respective oxidation catalytic ability, and finally found out an effective manganese oxide has a proper oxidation number. The required oxidation number for effective manganese oxide is 3.5 to 3.9, and more preferably 3.5 to 3.8.

On the other hand, manganese oxide have an ability of removing CO and $O_3$ without a ruthenium compound. In removing CO and $O_3$, a manganese oxide provides its oxygen atoms to CO and $O_3$, and as a result, CO is oxidized into $CO_2$ and $O_3$ is decomposed into $O_2$. After providing oxygen atoms to CO or $O_3$, the manganese oxide obtains oxygen atoms from $O_2$ in the air to recover to the original oxidation state. This action is repeated to remove CO or $O_3$ from the exhaust gas. The present inventors have also conducted various studies to find out the most effective manganese oxide for removing CO and $O_3$, and have found that a manganese oxide having oxidation number of 3.5 to 3.9 is preferable, and more preferably 3.5 to 3.8. In addition, when such a manganese oxide is present with a ruthenium compound, the CO and $O_3$ removing ability is further enhanced and is not deteriorated even at high humidity.

As far as a ratio between the number of manganese atoms and the number of oxygen atoms is available, the oxidation number of a manganese oxide can be calculated based on the entire electric charge of the manganese oxide (±0 in the case of neutral) by setting the oxidation number of an oxygen atom at −2. Since the manganese oxide is a non-stoichiometric compound, the ratio between the number of manganese atoms and the number of oxygen atoms is unlikely to be an integer. There may be a case that oxygen atoms exceeding the ratio of atom numbers exist around a given manganese atom, or the opposite case. Therefore, the respective oxidation number of manganese atoms do not have the same. Therefore, the oxidation number for calculation is used an average of oxidation numbers of all the manganese atoms.

The average oxidation number of manganese in the manganese oxide can be obtained by the following calculation. The content of active oxygen (i.e., oxygen capable of oxidizing $Fe^{2+}$ into $Fe^{3+}$) contained in a manganese oxide sample is obtained by the Iron sulfate (II) decomposition potassium permanganate titration method defined in JIS M 8233 (1982). Besides this, the content of manganese contained in the same sample is obtained by the Sodium periodate oxidation absorptiometric method defined in JIS G1213 (1981). The obtained values are applied to the following formula:

An average manganese oxidation number=$\{4\times(A\times54.9/16.0)+2\times[B-(A\times54.9/16.0)]\}/B$ (where A represents a mass percent of the active oxygen, B represents a mass percent of manganese, and the value of 54.9 and 16.0 respectively represent atomic weights of manganese and oxygen.) As described above, $NO_2$ reacts with moisture in the air to produce nitrate ion ($NO_3$), and this reaction produces NO (i.e., $3NO_2+H_2O\rightarrow2HNO_3+NO$). Thus produced NO is also oxidized into $NO_2$ by the manganese oxide, and is removed from the exhaust gas.

Based on the above-described construction, the harmful gas removing agent, including a manganese oxide having a specific oxidation number and a ruthenium compound, is capable of efficiently adsorbing and removing NO and $NO_2$ with no need of pre-treatment for adding $O_3$ to the exhaust gas. The harmful gas removing agent also has an ability of removing CO and $O_3$ with high efficiency.

As described above, in order to attain such excellent removing activity, it is essential that the removing agent includes both a manganese oxide and a ruthenium compound. In other words, the effect of the present invention is not obtained in the case where the removing agent includes only one of a manganese oxide or a ruthenium compound together. Similarly, the effect of the present invention is not obtained if two removing agents are used, one of which includes a manganese oxide only, and another of which includes a ruthenium compound only.

In the present invention, an excellent removing activity is produced in a synergistic effect between a manganese oxide having a specific average manganese oxidation number and a ruthenium compound. In addition, the harmful gas removing agent is also advantageous in that it can be regenerated by being exposed to hot air at relatively low temperature (for example, about 200° C.), thereby being repeatedly used.

Advantages of a harmful gas removing agent of the present invention will be further described.

It is conventionally known that a manganese oxide (trivalent or quadrivalent manganese oxides) has an ability of adsorbing and oxidizing NO alone or in a form of compound oxide with iron or copper (Japanese Unexamined Patent Publication Nos. 5-154339 and 5-253474). However, this ability is not sufficient, and there is a need of removing unreacted/unadsorbed NO and newly produced $NO_2$ at a subsequent stage. In an attempt to solve such a problem and to attain excellent removing activity for $NO_x$ such as NO and $NO_2$, CO, and $O_3$, the present inventors have tentatively produced various removing agents by combining manganese and various compound oxides, and manganese and various compounds, and have made a detailed studies on them.

As a result of studies, it has been found that the harmful gas removing agent exhibits an excellent NO, $NO_2$, CO and $O_3$ removing activity when it includes a manganese oxide having an average manganese oxidation number of 3.5 to 3.9, and more preferably 3.5 to 3.8, and nitrate or chloride of ruthenium. The average manganese oxidation number is an index of oxidation ability of manganese oxide and a removing ability of the removing agent. If an average manganese oxidation number is less than 3.5, a manganese oxide has only poor oxidation ability even in the presence of a ruthenium compound.

In oxidizing NO or CO and decomposing $O_3$, a manganese oxide provides its oxygen atoms to NO, CO, and $O_3$, and then, obtains oxygen atoms from $O_2$ in the air to recover to the original oxidation state. When the average manganese oxidation number is less than 3.5, the manganese oxide cannot provide its oxygen atoms to NO, CO, and $O_3$ at a sufficiently high speed.

Although a manganese oxide may have an average manganese oxidation number of 7.0 at the maximum, a manganese oxide becomes unstable when having an oxidation number of exceeding 4.0. Therefore, in reality, the maximum manganese oxidation number is 4.0. However, taking practicability into consideration, it is sufficient that the maximum manganese oxidation number is 3.9. This is because the production of manganese oxide having a manganese oxidation number of 3.8 or more, and especially 3.9 or more (a production method will be described later as a production method (A)) requires a large amount of oxidizer and a long time of oxidation. This is not economical. In addition, its adsorption effect is saturated and further adsorption cannot be expected at exceeding 3.9. Therefore, the average manganese oxidation number of 3.9 or less is sufficient. Based on this consideration, the preferable average manganese oxidation number is defined to 3.5 to 3.9.

At the average manganese oxidation number exceeding 3.5, removing activity is remarkably enhanced. The average manganese oxidation number can be easily increased to about 3.6 by adding increased amount of oxidizer or by elongating the oxidation time, accompanied by further increase in removing activity. It is easy to further increase the average manganese oxidation number to 3.8, although an increase in removing activity becomes slightly slower. However, further increase in the average manganese oxidation number exceeding 3.8 is difficult and requires high cost for oxidation, and no further enhancement of removing ability can be expected. Therefore, it is desirable, except for the case where an extra large manganese oxidation number is required, to set the average manganese oxidation number to 3.5 to 3.8 in accordance with the desired removing activity.

According to further studies conducted by the present inventors, it has been found that, when the harmful gas removing agent includes a manganese-copper compound oxide or a manganese-iron compound oxide instead of manganese oxide, its removing ability is further enhanced. In the present invention, "a compound oxide" does not means a simple mixture of two kinds of metal oxides, but an oxide in which two kinds of metals are combined with each other through oxygen atoms.

Typical method for producing the manganese-copper compound oxide or the manganese-iron compound oxide is a coprecipitation. In a production of manganese-copper compound oxide, alkaline is added to an aqueous solution of manganese and copper salt to produce a precipitation in which hydroxides of manganese and copper are mixed with each other on the molecular level. Then, the precipitation is oxidized, thereby producing a manganese-copper compound oxide. The same steps are conducted for obtaining a manganese-iron compound oxide. In this case, mere mixture of powdered hydroxides or slurry of manganese and copper/iron cannot attain a sufficient NO removing activity.

The manganese-copper compound oxide and the manganese-iron compound oxide are effective in removing harmful gas due to the following reason. In the compound oxide, oxygen atoms easily moves. This facilitates the provision of oxygen atoms from the compound oxide to harmful gases and from $O_2$ in the air to the compound oxide.

The preferable average manganese oxidation number of the manganese-copper compound oxide and the manganese-iron compound oxide is 3.5 to 3.9, and more preferably 3.5 to 3.8. As is the case of including manganese oxide, the removing activity is gradually increased with the average manganese oxidation number of exceeding 3.5. At the average manganese oxidation number exceeding 3.9 or more, further increase is difficult and no further increase in removing activity can be expected.

It is preferable that the manganese-copper compound oxide has a mass ratio of [Mn/(Mn+Cu)] of 0.15 or more, and more preferably 0.45 or more. With the mass ratio less than 0.15, the amount of manganese is too short and the removing activity becomes poorer than the case of including a manganese oxide. The preferable upper limit thereof is 0.95. With a mass ratio exceeding 0.95, manganese cannot successfully react with copper, and as a result, removing activity is deteriorated. Similarly, it is preferable that the manganese-iron compound oxide has a mass ratio of [Mn/(Mn+Fe)] of 0.1 or more, and more preferably 0.3 or more. The preferable upper limit thereof is 0.85.

According to further aspect of the present invention, the harmful gas removing agent, in addition to the manganese oxide, the manganese-copper compound oxide or the manganese-iron compound oxide, and the ruthenium compound, further includes an alkali metal compound or a tin compound, or both of them if necessary. With this arrangement, the harmful gas removing agent has further increased gas removing ability.

With appropriate amount of alkali metal compound such as hydroxides, carbonates, and bicarbonates of alkali metals, the harmful gas removing agent has high durability against $SO_x$ in the exhaust gas, as well as an ability of removing such $SO_x$. Specifically, the manganese oxide and the compound oxides oxidize $SO_2$ into $SO_3$. The resultant $SO_3$ reacts with moisture present in the air to produce sulfuric acid. The resultant sulfuric acid reacts, not with the manganese oxide or the manganese-copper/manganese-iron compound oxide, but with the alkali metal compound to produce sulfate, thereby avoiding the manganese oxide and the compound oxide from being sulfated. In addition, $SO_3$ is removed in a form of alkali sulfate. In this manner, $SO_x$ is easily removed from the exhaust gas. Contrary to this, if no alkali metal compound is included, the manganese oxide and the manganese-copper/manganese-iron compound oxides react with $SO_3$ to be sulfated. As a result, these oxides cannot react with $NO_x$, CO, and $O_3$ and the removing activity is hindered. With the alkali metal compound, the harmful gas removing agent is not poisoned by $SO_x$, and also efficiently removes $SO_x$ from the exhaust gas.

Preferable examples of the alkali metal compound includes hydroxides, carbonates, and bicarbonates of alkali metals, and an especially preferable alkali metal is potassium. The preferable content of the alkali metal compound is 0.1 to 6.0 mass percent pure) converted to alkali metal. With the content of less than 0.1 mass percent, the aforementioned effects of $SO_x$ cannot be attained. With the content of exceeding 6.0 mass percent, the effects are saturated and further increased effects cannot be expected. Rather, with the content of exceeding 6.0 mass percent, the agent easily absorbs moisture to cause a deterioration of its gas removing ability. From such viewpoints, the preferable content of alkali metal compound is 0.5 to 4.0 mass percent converted to alkali metal.

On the other hand, in the case where the agent includes a tin compound instead of the alkali metal compound together with the manganese oxide, the compound oxides, and the ruthenium compound, the agent has high resistance to acid and its removing ability lasts for a long period of time. The tin compound also has an effect of preventing the agent from being poisoned by a sulfur compound, and therefore, the agent including tin compounds is suitable for treating an exhaust gas containing harmful gases such as $SO_2$ or $SO_3$. Examples of tin compounds used in the present invention include stannous chloride and stannic chloride. The preferable content of tin compound is 0.05 to 5.0 mass percent, and more preferably 0.1 to 2 mass percent converted to tin. With a content of less than 0.05 mass percent, the agent has only insufficient oxidizing and removing ability. With the content exceeding 5.0 mass percent, the effect of tin compound is saturated and no further effect can be expected.

It is possible that the harmful gas removing agent includes both the alkali metal compound and the tin compound depending on the necessity to utilize their respective advantages.

Especially preferable as a ruthenium compound used in the present invention is ruthenium chloride. Ruthenium nitrate has the same effect as ruthenium chloride; however, it is impractical in actual application because it is more expensive than ruthenium chloride and it is not economical. Ruthenium in a form of metal has no effect of a ruthenium compound, and no effect can be expected beyond the effect obtained in the case of using the manganese oxide and the compound oxide. This is because ruthenium in a form of metal is not capable of forming nitrosyl complex. As described above, a nitrosyl complex is necessary to remove NO and $NO_2$. Ruthenium chloride is capable of forming a nitrosyl complex, whereas ruthenium in a form of metal is not capable of forming a nitrosyl complex.

Ruthenium chloride is gradually oxidized at a temperature of 300° C. or higher. In addition, the manganese oxide and the compound oxides gradually release their oxygen atoms at a temperature 300° C. to 350° C. and their manganese oxidation number is decreased, and as a result, their ability of oxidation is deteriorated. Therefore, it is preferable that the harmful gas removing agent of the present invention is always kept from the temperature of 300° C. or higher in all time including its production and application.

The preferable content of the ruthenium compound included in the harmful gas removing agent is 0.05 to 2.0 mass percent, and more preferably 0.1 to 1.0 mass percent, taking into consideration the cost efficiency and efficient removing activity. With the content of less than 0.05 mass percent, sufficient removing activity cannot be obtained. When the content of ruthenium exceeds 0.05 mass percent, the agent exhibits an excellent ability of removing harmful gas. With the content of exceeding 2.0 mass percent, the effect is saturated and it is not economical.

It is preferable that the manganese oxide is produced by oxidizing hydroxide or carbonate of manganese in an oxidation condition. Such a method makes it easy to increase manganese oxidation number to 3.5 or more, thereby giving excellent removing ability to the agent. The "oxidation condition" means a condition with a liquid phase or a gaseous phase containing an oxidizer. Typical examples of oxidation process are methods (A) and (B) described below.

Method (A): hydroxide or carbonate of manganese is suspended in an aqueous solution containing at least one oxidizer such as permanganates, persulfates, and hydrogen peroxide. The resultant is stirred for an appropriate time, and then, is washed with water and dried. In this method, hydroxide of manganese is produced by adding alkali hydroxide to nitrate or sulfate of manganese, and then, the oxidizer is added to react them with each other. Or alternatively, nitrate or sulfate of manganese and alkali hydroxide are simultaneously added to the oxidizer to react them with each other.

Method (B): hydroxide or carbonate of manganese is heated in an gas flow containing $O_2$.

When the methods (A) and (B) are adopted in producing the manganese-copper oxide or the manganese-iron compound oxide, a mixture of hydroxides of manganese and copper or hydroxides of manganese and iron is precipitated by coprecipitation. Then, using the same oxidation process as those used for the manganese oxide, the precipitation is oxidized to produce a manganese-copper compound oxide or a manganese-iron compound oxide.

According to the methods (A) and (B), the manganese oxide or the manganese-copper/manganese-iron compound oxide is produced while gaining high manganese oxidation number as well as large specific surface area and large pore volume. Thus obtained manganese oxide and the compound oxides give excellent removing ability to the agent. In this methods (A) and (B), there is no problem even in the case of using an economical manganese compound having low oxidation number as a starting material. From such a viewpoint, it is common to use hydroxide or carbonate of manganese.

In the method (B), the heating processing is carried out at a temperature of 200 to 450° C., and preferably 250 to 400° C., and more preferably 300 to 350° C. for 2 to 10 hours. In these conditions, it will be possible to produce manganese oxide and compound oxide having a large specific surface area. With heating processing at a temperature lower and a time shorter than the above preferable ranges, oxygen atoms cannot be sufficiently supplied from the air to manganese, and the manganese oxidation number cannot be increased to a sufficient value. Contrary to this, with heating at a temperature higher and a time longer than the above preferable range, oxygen detaches from the manganese oxide and the compound oxide, and the manganese oxidation number thereof decreases. In the case where manganese-copper compound oxide is produced, copper may be sintered and its specific surface area and pore volume is likely to decrease. Accordingly, to increase the oxidation number of manganese, specific surface area, and pore volume, and then increase the removing ability, the method (A) is more advantageous.

According to the present invention, the shape of a harmful gas removing agent is not specifically limited, and it can be formed in a desired shape by an appropriate molding method depending on an intended application. It may be in a shape of granules or tablets by a method such as extrusion and tablet machining, or also may be in a honeycomb shape by a method such as extrusion and paper machining. The shaping may be conducted at any time after oxidizing hydroxide or carbonate of manganese to produce a manganese oxide, or hydride or carbonate of manganese and copper or manganese and iron to produce the compound oxide. It is preferable that the agent is molded into a desired shape before the ruthenium compound is supported. This is because a ruthenium compound is expensive and is preferably supported in the vicinity of the surface of the agent. It is important to select a molding method which has no necessity of sintering the agent after including the ruthenium compound at high temperature; otherwise, the removing activity of the agent becomes insufficient. Similarly, in the case of producing a harmful gas removing agent including an alkali metal compound or a tin compound, it is preferable that the alkali metal compound or the tin compound is supported in the vicinity of the surface of the agent. For this purpose, it is preferable to select a molding method which has no necessity of sintering the agent after including the alkali metal compound or the tin compound.

According to the present invention, a harmful gas removing agent is charged in a container having an arbitrary shape, through which an exhaust gas being treated is passed through. Passing through the agent at an appropriate space velocity, the harmful gas contained in the exhaust gas is adsorbed, oxidized, or decomposed by the agent, thereby being removed from the exhaust gas. The removing ability of the agent is influenced by an effective contact area between the agent and the exhaust gas being treated. From this viewpoint, it is preferable that the harmful gas removing agent has a specific surface area of 70 $m^2/g$ or more, and more preferably 100 $m^2/g$ or more, and the most preferably 120 $m^2/g$ or more.

It is to be noted that a harmful gas removing agent of the present invention is effective for removing harmful gas including $NO_x$ such as NO and $NO_2$, CO and $O_3$ from exhaust gases. The harmful gas removing agent oxidizes and adsorbs $NO_x$, while oxidizes CO and decomposes $O_3$. These activities result in removing such harmful gases from the exhaust gas being treated, and therefore, the word "remove" and "a removing agent" include these activities and agents having such functions in the present invention.

Hereinafter, the present invention will be further described by way of examples. It is to be understood, however, that various changes and modifications will be apparent to those skilled in the art. Therefore, unless otherwise such changes and modifications depart from the scope of the present invention, they should be construed as being included therein.

EXAMPLES

Example 1

670 g of manganese nitrate [Mn $(NO_3)_2.6H_2O$] was put in a five-liter beaker, to which two liter of pure water was added, and then, was dissolved with stirring to produce a mother liquor (a liquid A). Besides this, 137 g of potassium hydroxide (KOH) was put in a two-liter beaker containing one liter of pure water, and was dissolved with stirring to produce a precipitant (a liquid B). The obtained liquid A and the liquid B were simultaneously put in a five-liter beaker containing one liter of pure water with stirring at a constant pH to produce a precipitate of manganese hydroxide. Besides this, 74 g of potassium permanganate ($KMnO_4$) was put in a two-liter beaker, to which two liter of pure water was added, and then, was dissolved with stirring to obtain a potassium permanganate aqueous solution. Then, the aqueous solution was added to the precipitate of manganese hydroxide with stirring, and was further stirred for 60 minutes to oxidize manganese hydroxide in a liquid phase. As a result, a precipitate of manganese oxide was obtained. The precipitate was repeatedly taken out by filtration and was washed with water to remove impurities therefrom. After that, the resultant was put into a drier and was dried at a temperature of 110° C. for 20 hours. Then, the dried manganese oxide was crushed into granules, and then a small amount of graphite was added thereto as a lubricant, and further mixed with each other. After that, the manganese oxide was molded into a shape of tablet having a diameter of ⅛ inch by a tablet machine.

Next, 1.39 g of ruthenium chloride was dissolved in 30 cc of pure water to obtain a ruthenium chloride aqueous solution. The aqueous solution was sprayed to the tablet-shaped manganese oxide so that the manganese oxide supported ruthenium chloride, and then, the manganese oxide was dried at 110° C. for 4 hours in a drier. As a result, a harmful gas removing agent according to Example 1 was obtained. The harmful gas removing agent had a composition of 65.8 mass percent of manganese and 0.30 mass percent of ruthenium. Its specific surface area was 105 $m^2/g$ and its pore volume was 0.44 cc/g. The average manganese oxidation number was 3.69.

Example 2

A harmful gas removing agent of Example 2 was obtained by repeating the steps of Example 1, except for that the precipitate of manganese hydroxide, without being oxidized in a liquid phase, was repeatedly taken out by filtration and was washed with water to remove impurities therefrom. The resultant was dried at 100° C. for 20 hours in a drier, and then further heated at 300° C. for 4 hours in the air. In addition, the amount of ruthenium chloride used was 1.0 g. The harmful gas removing agent had a composition of 68.4 mass percent of manganese and 0.31 mass percent of ruthenium. Its specific surface area was 72 $m^2/g$ and its pore volume was 0.33 cc/g. The average manganese oxidation number was 3.66.

Comparative Examples 1 and 2

A harmful gas removing agent of Comparative Example 1 was obtained repeating the steps of Example 1, except that ruthenium chloride aqueous solution was not sprayed to the tablet-shaped manganese oxide, and therefore, the manganese oxide did not support ruthenium chloride. Besides this, a harmful gas removing agent of Comparative Example 2 was obtained repeating the steps of Example 2, except that ruthenium chloride aqueous solution was not sprayed to the tablet-shaped manganese oxide, and therefore, the manganese oxide did not support ruthenium chloride. The manganese oxides of the harmful gas removing agents of Comparative Examples 1 and 2 respectively had average manganese oxidation numbers of 3.69 and 3.66.

Example 3

380 g of manganese sulfate ($MnSO_4.5H_2O$) and 125 g of copper sulfate ($CuSO_4.5H_2O$) were put into a five-liter beaker, to which two liter of pure water was added, and then were dissolved with stirring to produce a mother liquor (a liquid A). Besides this, 230 g of sodium hydroxide (NaOH) was slowly added into a two-liter beaker containing 1 liter of pure water with stirring to completely dissolve sodium hydroxide. As a result, a precipitant (a liquid B) was obtained. Then, the liquid B was gradually added to the the liquid A with stirring for about 60 minutes to produce a coprecipitate of manganese hydroxide and copper hydroxide. Besides the above, 210 g of ammonium persulfate [$(NH_4)_2S_2O_8$] was dissolved in pure water to prepare two liter of ammonium persulfate aqueous solution. Into the coprecipitate of manganese hydroxide and copper hydroxide, the ammonium persulfate solution was gradually added and was stirred for 60 minutes to oxidize the coprecipitate in a liquid phase. As a result, a coprecipitate of manganese-copper compound oxide was obtained. Next, the coprecipitate was repeatedly taken out by filtration and was washed with water to remove impurities therefrom. After that, the resultant was dried in a drier. The dried product was uniformly mixed with alumina sol (#200; product name, manufactured by Nissan Chemical Industries, Ltd.) while adjusting its water content to a level suitable for being molded by wet molding. Then, the compound oxide was molded into a shape of tablet having a diameter of ⅛ inch by a screw type extruder, and was dried at 110° C. for 20 hours. As a result, a tablet-shaped manganese-copper compound oxide was obtained.

The same ruthenium chloride aqueous solution as that used in Example 1 was sprayed to the manganese-copper compound oxide so that the compound oxide supported ruthenium chloride, and then was dried at 110° C. for 4 hours. As a result, a harmful gas removing agent of Example 3 was obtained. The agent had a composition of 53.9 mass percent of manganese, 13.6 mass percent of copper, 0.29 mass percent of ruthenium, and 2.8 mass percent of aluminum. Its specific surface area was 154 $m^2/g$, and its pore volume was 0.43 cc/g. The average manganese oxidation number was 3.70.

Examples 4 and 5

Harmful gas removing agents of Examples 4 and 5 respectively were obtained by repeating the steps of Example 1 except for that in Example 4, 238 g of manganese sulfate, 315 g of copper sulfate, and 233 g of sodium hydroxide were used, and in Example 5, 95 g of manganese sulfate, 504 g of copper sulfate, and 217 g of sodium hydroxide were used. The harmful gas removing agent of Example 4 had a composition of 33.7 mass percent of manganese, 34.2 mass percent of copper, 0.30 mass percent of ruthenium, and 2.6 mass percent of aluminum. Its specific surface area was 126 $m^2/g$ and its pore volume was 0.41 cc/g. The average manganese oxidation number was 3.72. The harmful gas removing agent of Example 5 had a composition of 13.4 mass percent of manganese, 56.2 mass percent of copper, 0.29 mass percent of ruthenium, and 2.7 mass percent of aluminum. Its specific surface area was 120 $m^2/g$, and its pore volume was 0.40 cc/g. The average manganese oxidation number of the compound oxide was 3.71.

Example 6

A harmful gas removing agent of Example 6 was obtained by repeating the steps of Example 3 except for that in Example 6, 323 g of potassium hydroxide was used instead of 230 g of sodium hydroxide, and 74 g of potassium permanganate was used instead of 210 g of ammonium persulfate for oxidizing the coprecipitate in a liquid phase. The harmful gas removing agent of Example 6 had a composition of 53.3 mass percent of manganese, 11.0 mass percent of copper, 0.29 mass percent of ruthenium, and 4.4 mass percent of aluminum. Its specific surface area was 168 $m^2/g$, and its pore volume was 0.47 cc/g. The average manganese oxidation number was 3.72.

Examples 7 and 8

Harmful gas removing agents of Examples 7 and 8 were respectively obtained by repeating the steps of Example 3 except for that in Example 7, 0.47 g of ruthenium chloride was used instead of 1.39 g of ruthenium chloride, and in Example 8, 2.78 g of ruthenium chloride was used instead of 1.39 g of ruthenium chloride (in Example 3, 1.39 g of ruthenium chloride was dissolved in 30 cc or pure water). The harmful gas removing agent of Example 7 had a composition of 51.8 mass percent of manganese, 12.9 mass percent of copper, 0.10 mass percent of ruthenium, and 2.5 mass percent of aluminum. Its specific surface area was 158 $m^2/g$, and its pore volume was 0.45 cc/g. The average manganese oxidation number of the compound oxide was 3.70. The harmful gas removing agent of Example 8 had a composition of 51.2 mass percent of manganese, 13.5 mass percent of copper, 0.59 mass percent of ruthenium, and 2.7 mass percent of aluminum. Its specific surface area was 147 $m^2/g$, and its pore volume was 0.40 cc/g. The average manganese oxidation number was 3.70.

Example 9

A harmful gas removing agent of Example 9 was obtained by repeating the steps of Example 3 except for that in Example 9, a ruthenium nitrate aqueous solution (containing 4.5 mass percent of ruthenium) was used instead of ruthenium chloride aqueous solution of Example 3, and 20 ml of the ruthenium nitrate solution was sprayed to the obtained manganese-copper compound oxide. The harmful gas removing agent had a composition of 54.3 mass percent of manganese, 14.0 mass percent of copper, 0.26 mass percent of ruthenium, and 2.8 mass percent of aluminum. Its specific surface area was 160 $m^2/g$, and its pore volume was 0.45 cc/g. The average manganese oxidation number was 3.73.

Example 10

A harmful gas removing agent of Example 10 was obtained by repeating the steps of Example 3 except for that in Example 10, a coprecipitate of manganese hydroxide and copper hydroxide, without being oxidized in a liquid phase, was taken out by filtration, washed with water, dried, and then was heated at 350° C. for 4 hours in the air. The harmful gas removing agent had a composition of 55.0 mass percent of manganese, 14.2 mass percent of copper, 0.30 mass percent of ruthenium, and 2.8 mass percent of aluminum. Its specific surface area was 89 $m^2/g$, and its pore volume was 0.36 cc/g. The average manganese oxidation number was 3.66.

Examples 11 and 12

Harmful gas removing agents of examples 11 and 12 were respectively obtained by repeating the steps of Example 3 except for that in Example 11, 3.0 g of potassium carbonate was added when the compound oxide was oxidized in a liquid phase before being extruded into a shape of tablet, and in Example 12, 5.0 g of stannous chloride was added to a ruthenium chloride aqueous solution used for supporting ruthenium chloride. The harmful gas removing agent of Example 11 had a composition of 53.2 mass percent of manganese, 13.1 mass percent of copper, 0.29 mass percent of ruthenium, 0.73 mass percent of potassium, and 2.6 mass percent of aluminum. Its specific surface area was 135 $m^2/g$, and its pore volume was 0.38 cc/g. The average manganese oxidation number was 3.70. The harmful gas removing agent of Example 12 had a composition of 50.9 mass percent of manganese, 13.8 mass percent of copper, 0.30 mass percent of ruthenium, 0.98 mass percent of tin, and 2.7 mass percent of aluminum. Its specific surface area was 148 m$^2$/g, and its pore volume was 0.41 cc/g. The average manganese oxidation number was 3.70.

Comparative Examples 3 and 4

A harmful gas removing agent of Comparative Example 3 was obtained by repeating the steps of Example 3, except that a ruthenium chloride aqueous solution was not sprayed to the tablet-shaped compound oxide. The harmful gas removing agent of Comparative Example 3 had a composition of 52.8 mass percent of manganese, 13.4 mass percent of copper, and 2.8 mass percent of aluminum. Its specific surface area was 150 m$^2$/g, and its pore volume was 0.44 cc/g. The average manganese oxidation number thereof was 3.70. A harmful gas removing agent of Comparative Example 4 was obtained by repeating the same steps of Example 10, except that a ruthenium chloride aqueous solution was not sprayed to the tablet-shaped compound oxide. The harmful gas removing agent had a composition of 54.0 mass percent of manganese, 13.5 mass percent of copper, and 2.5 mass percent of aluminum. Its specific surface area was 92 m$^2$/g, and its pore volume was 0.38 c/g. The average manganese oxidation number was 3.70.

Example 13

143 g of manganese sulfate and 487 g of ferrous sulfate (FeSO$_4$.7H$_2$O) were put into a five-liter beaker, to which two liter of pure water was added, and then were dissolved with stirring to produce a mother liquor (a liquid A). Besides this, 303 g of sodium carbonate was added to a two-liter beaker containing one liter of pure water with stirring to produce a precipitant (a liquid B). Next, the liquid A was added to the liquid B with stirring for 60 minutes to produce a coprecipitate of basic carbonate of manganese and basic carbonate of iron. Then, 210 g of ammonium persulfate was diluted with pure water, and 2 liter of the ammonium persulfate aqueous solution was added to the coprecipitate with stirring for 60 minutes to oxidize the coprecipitate in a liquid phase. As a result, a manganese-iron compound oxide in a form of slurry was obtained. The slurry was taken out by filtration, washed with water, and then was dried. The resultant was crushed into granules, and a small amount of graphite was added to the granules. The mixture was mixed, and was molded into a shape of tablet having a diameter of ⅛ inch by a tablet machine. After that, as was conducted in Example 1, a ruthenium chloride aqueous solution was sprayed to the tablet-shaped compound oxide so that the compound oxide supported ruthenium chloride. As a result, a harmful gas removing agent of Example 13 was obtained. The harmful gas removing agent had a composition of 21.1 mass percent of manganese, 44.6 mass percent of iron, and 0.31 mass percent of ruthenium. Its specific surface area was 122 m$^2$/g, and its pore volume was 0.38 cc/g. The average manganese oxidation number was 3.73.

Examples 14 and 15

Harmful gas removing agent of Examples 14 and 15 were respectively obtained by repeating the steps of Example 13 except for that in Example 14, 48 g of manganese sulfate, 626 g of ferrous sulfate, and 287 g of sodium carbonate were used, and in Example 15, 333 g of manganese sulfate, 210 g of ferrous sulfate, and 317 g of sodium carbonate were used. The harmful gas removing agent of Example 14 had a composition of 7.5 mass percent of manganese, 62.4 mass percent of iron, and 0.30 mass percent of ruthenium. Its specific surface area was 104 m$^2$/g, and its pore volume was 0.35 cc/g. The average manganese oxidation number was 3.73. The harmful gas removing agent of Example 15 had a composition of 53.2 mass percent of manganese, 20.8 mass percent of iron, and 0.31 mass percent of ruthenium. Its specific surface area was 118 m$^2$/g, and its pore volume was 0.37 c/g. The average manganese oxidation number was 3.71.

Examples 16 and 17

Harmful gas removing agents of Examples 16 and 17 were obtained by repeating the steps of Example 13 except for that in Example 16, 0.82 g of ruthenium chloride was used, and in Example 17, 3.08 g of ruthenium chloride was used. The harmful gas removing agent of Example 16 had a composition of 23.4 g of manganese, 49.0 g of iron, and 0.18 g of ruthenium. Its specific surface area was 127 m$^2$/g, and its pore volume was 0.39 cc/g. The average manganese oxidation number was 3.73. The harmful gas removing agent of Example 17 had a composition of 22.9 mass percent of manganese, 48.5 mass percent of iron and 0.68 mass percent of ruthenium. Its specific surface area was 116 m$^2$/g, and its pore volume was 0.36 cc/g. The average manganese oxidation number was 3.73.

Example 18

A harmful gas removing agent of Example 18 was obtained by repeating the steps of Example 13 except for that a coprecipitate of basic carbonate of manganese and basic carbonate of iron, without being oxidized in a liquid phase, was taken out by filtration, washed with water, and then dried and heated at 300° C. for 4 hours in an air. The harmful gas removing agent of Example 18 had a composition of 23.6 mass percent of manganese, 49.4 mass percent of iron, and 0.30 mass percent of ruthenium. Its specific surface area was 113 m$^2$/g, and its pore volume was 0.35 cc/g. The average manganese oxidation number was 3.67

Examples 19 and 20

A harmful gas removing agent of Example 19 was obtained by repeating the steps of Example 13 except for that instead of using a manganese-iron compound oxide which was dried and molded into a shape of tablet by tablet molding, silica sol (Snowtex-30; product name, manufactured by Nissan Chemical Industries, Ltd.) was added to the dried and crushed compound oxide. The mixture was kneaded to which 2.0 g of potassium carbonate was added, and then was molded in the same manner as that of Example 3 and dried. Then, the same ruthenium chloride aqueous solution as that used in Example 1 was sprayed to the tablet-shaped compound oxide as was conducted in Example 1. As a result, a harmful gas removing agent of Example 19 was obtained. Besides this, a harmful gas removing agent of Example 20 was obtained by repeating the steps of Example 19 except for that potassium carbonate was not added, and 4 g of stannous chloride was added to the ruthenium chloride aqueous solution. The harmful gas removing agent of Example 19 had a composition of 21.4 mass percent of manganese, 44.8 mass percent of iron, 0.30 mass percent of ruthenium, 0.51 mass percent of potassium, and 2.6 mass percent of silicon. Its specific surface area was 118 m$^2$/g, and its pore volume was 0.37 cc/g. The average manganese oxidation number was 3.73. The harmful gas removing agent of Example 20 had a composition of 21.6 mass percent of manganese, 44.3 mass percent of iron, 0.31 mass percent of ruthenium, 0.82 mass percent of tin, and 2.8 mass percent of silicon. Its specific surface area was 122 m²/g, and its pore volume was 0.40 cc/g. The average manganese oxidation number was 3.73.

Comparative Examples 5 and 6

A harmful gas removing agent of Comparative Example 5 was obtained by repeating the steps of Example 13, except for that a ruthenium chloride aqueous solution was not sprayed to the tablet-shaped compound oxide, and therefore, the compound oxide did not support ruthenium chloride. The harmful gas removing agent of Comparative Example 5 had a composition of 20.4 mass percent of manganese and 43.7 mass percent of iron. Its specific surface area was 114 m²/g, and its pore volume was 0.35 cc/g. The average manganese oxidation number thereof was 3.73. Besides this, a harmful gas removing agent of Comparative Example 6 was obtained by repeating the steps of Example 18, except for that a ruthenium chloride aqueous solution was not sprayed to the tablet-shaped compound oxide, and therefore, the compound oxide did not support ruthenium chloride. The harmful gas removing agent of Comparative Example 6 had a composition of 22.8 mass percent of manganese and 48.7 mass percent of iron. Its specific surface area was 115 m²/g, and its pore volume was 0.36 cc/g. The average manganese oxidation number was 3.73.

Performance Evaluation Experiment 1

The harmful gas removing agents obtained in Examples 1 to 20 and Comparative Examples 1 to 6 were respectively charged into a tube made of stainless steel. The stainless steel tube was equipped with a water-cooled jacket and a heater. With this arrangement, $NO_x$ was desorbed at a constant temperature and the harmful gas removing agents were regenerated thereby being repeatedly used. Specifically, the respective harmful gas removing agents were charged in the stainless steel tube in an amount of 16.0 cm³ (and to a height of 6.0 cm). Through the respective harmful gas removing agents charged in the tube, passed was a sample gas containing 5.0 ppm of $NO_x$ (NO:4.5 ppm, $NO_2$: 0.5 ppm; the balance; air) at a flow rate of 5.2Nliter/min (space velocity: 20000h$^{-1}$) at a temperature of 35° C. and a relative humidity of 60% for 12 hours. The concentrations of NO and $NO_x$ (i.e., NO+$NO_2$) respectively were continuously measured at an outlet of the tube using a chemiluminescence analyzer. After that, an average removing rate of $NO_x$ for 12 hours and an average releasing rate of $NO_2$ for 12 hours were obtained by the following calculation:

An average $NO_x$ removing rate=(1-an average concentration of $NO_x$ at the outlet of the tube/the concentration of $NO_x$ at the inlet of the tube)×100(%); and An average $NO_2$ releasing rate=(an average concentration of $NO_2$ at the outlet of the tube/the concentration of $NO_x$ at the inlet of the tube×100(%)

The results of the calculation are shown in Tables 1 and 2.

Performance Evaluation Experiment 2

The harmful gas removing agents obtained in Examples 3 and 12 were respectively charged in the same type of stainless tubes as those used in Performance Evaluation Experiment 1. The processes of Performance Evaluation Experiment 1 were repeated 10 times to remove $NO_x$ from a sample gas and subsequently to regenerate the removing agents. The regeneration of the agent was conducted by supplying a dry air at a flow rate of 1.5Nliter/min at 200° C. for 4 hours. An average removing rates of $NO_x$ for 12 hours and an average releasing rate of $NO_2$ for 12 hours were obtained from the same calculation as that used in Performance Evaluation Experiment 1. The results of calculations are shown in Table 3.

TABLE 1

| Removing Agent | Average removing rate A of $NO_x$ (%) | Average releasing rate B of $NO_2$ (%) |
|---|---|---|
| Example 1 | 71.0 | 1.2 |
| Example 2 | 65.7 | 1.9 |
| Com. Ex. 1 | 6.3 | 13.4 |
| Com. Ex. 2 | 6.1 | 8.9 |
| Example 3 | 84.7 | 0.7 |
| Example 4 | 81.8 | 0.4 |
| Example 5 | 80.4 | 1.1 |
| Example 6 | 83.9 | 1.0 |
| Example 7 | 74.0 | 3.1 |
| Example 8 | 90.3 | 0.3 |
| Example 9 | 78.5 | 0.8 |
| Example 10 | 78.5 | 1.2 |
| Example 11 | 90.1 | 0.5 |
| Example 12 | 83.9 | 0.9 |

TABLE 2

| Removing Agent | Average removing rate A of $NO_x$ (%) | Average releasing rate B of $NO_2$ (%) |
|---|---|---|
| Com. Ex. 3 | 9.3 | 24.0 |
| Com. Ex. 4 | 7.5 | 27.3 |
| Example 13 | 79.6 | 1.1 |
| Example 14 | 75.4 | 0.8 |
| Example 15 | 81.8 | 1.2 |
| Example 16 | 66.0 | 5.1 |
| Example 17 | 84.5 | 0.7 |
| Example 18 | 74.3 | 1.3 |
| Example 19 | 84.4 | 0.7 |
| Example 20 | 80.9 | 1.1 |
| Com. Ex. 5 | 6.7 | 24.1 |
| Com. Ex. 6 | 8.2 | 20.6 |

TABLE 3

| | Example 3 | | Example 12 | |
|---|---|---|---|---|
| Removing agent Times of removal | Average removing rate A of $NO_x$ (%) | Average releasing rate B of $NO_2$ (%) | Average removing rate A of $NO_x$ (%) | Average releasing rate B of $NO_2$ (%) |
| 1st | 84.7 | 0.7 | 83.9 | 0.9 |
| 2nd | 82.9 | 0.7 | 83.4 | 1.0 |
| 3rd | 81.7 | 0.5 | 82.7 | 0.7 |
| 4th | 80.6 | 0.6 | 81.9 | 0.7 |
| 5th | 79.0 | 0.7 | 81.7 | 0.5 |
| 6th | 78.4 | 1.1 | 81.1 | 0.8 |
| 7th | 77.9 | 0.7 | 81.2 | 0.5 |
| 8th | 77.5 | 0.5 | 80.8 | 0.6 |
| 9th | 77.0 | 0.7 | 80.0 | 0.7 |
| 10th | 76.8 | 0.8 | 80.9 | 1.0 |

Comparative Examples 7 and 8, and Examples 21, 22, and 23

Harmful gas removing agents of Comparative Examples 7 and 8 and Examples 21, 22, and 23 were respectively obtained by repeating steps of Example 1, except for that in Comparative Examples 7 and 8, 15 g and 30 g of potassium permanganate were respectively used, and in Examples 21, 22, and 23, 45 g, 60 g, and 120 g of potassium permanganate were respectively used. In Comparative Examples 7 and 8, an average manganese oxidation number was 3.27 and 3.40, respectively. In Examples 21, 22, and 23, an average manganese oxidation numbers was 3.51, 3.62, and 3.78, respectively. As has been described, in Example 1, an average manganese oxidation number was 3.69.

Performance Evaluation Experiment 3

The $NO_x$ removing ability of the respective harmful gas removing agents of Examples 1, 21, 22, and 23, and those of Comparative Examples 7 and 8 were evaluated by repeating the steps of Performance Evaluation Experiment 1. The results are as shown in Table 4. As seen in Table 4, the removing activity was rapidly increased at the average manganese oxidation number exceeding about 3.5. The increase in removing activity became slow at the average manganese oxidation number of about 3.6, and the effect was substantially saturated at about 3.7.

TABLE 4

| Removing agent | Manganese oxidation number | Average Removing rate A of $NO_x$ (%) | Average releasing rate B of $NO_2$ (%) |
|---|---|---|---|
| Com. Ex. 7 | +3.27 | 40.3 | 0.5 |
| Com. Ex. 8 | +3.40 | 43.9 | 0.4 |
| Example 21 | +3.51 | 50.2 | 0.7 |
| Example 22 | +3.62 | 65.7 | 0.8 |
| Example 1 | +3.69 | 71.0 | 1.2 |
| Example 23 | +3.78 | 72.8 | 1.0 |

Example 24

A harmful gas removing agent of Example 24 was obtained by repeating the steps of Example 3 except for that 380 g of manganese sulfate was used instead of 380 g of manganese sulfate and 125 g of copper sulfate. The obtained precipitate was oxidized in a liquid phase, and was taken out by filtration and washed with water. Then, the resultant was dried and crushed into powder by a ball mill to produce a powdered manganese oxide. In addition, this step was repeated except that 125 g of copper sulfate was used instead of 380 g of manganese sulfate to produce a powdered copper oxide.

The powdered manganese oxide and the powdered copper oxide were kneaded with each other by a kneader in such a manner that the mass ratio therebetween became the same as that in Example 3 converted to manganese and copper. Subsequently, repeating the steps of Example 3, the kneaded product was molded into a shape of tablet having a diameter of ⅛ inch, and a ruthenium chloride aqueous solution was sprayed thereto so that the molded product supported ruthenium chloride. As a result, a harmful gas removing agent was obtained. The harmful gas removing agent had a composition of 54.2 mass percent of manganese, 13.7 mass percent of copper, 0.30 mass percent of ruthenium, and 2.7 mass percent of aluminum. Its specific surface area was 146 $m^2/g$, and its pore volume was 0.45 cc/g. The average manganese oxidation number thereof was 3.74.

Performance Evaluation Experiment 4

The $NO_x$ removing ability of the harmful gas removing agent of Example 24 was evaluated by repeating the steps of Performance Evaluation Experiment 1. The results are shown in Table 5. As is seen in Table 5, the harmful gas removing agent of Example 24 had a $NO_x$ removing ability relatively poorer than that of the harmful gas removing agent of Example 3 including the compound oxide with the same composition and properties as those of Example 3 (in Example 3, the average manganese oxidation number was 3.70).

TABLE 5

| Removing agent | Manganese oxidation number | Average Removing rate A of $NO_x$ (%) | Average releasing rate B of $NO_2$ (%) |
|---|---|---|---|
| Example 24 | +3.74 | 68.2 | 0.4 |
| Example 3 | +3.70 | 84.7 | 0.7 |

Examples 25, 26, 27, and 28 and Comparative Example 9

Harmful gas removing agents of Examples 25, 26, 27 and 28 were obtained by repeating the steps of Example 3, except that 460 g, 420 g, 340 g, and 40 g, of manganese sulfate, 0 g, 60 g, 180 g, and 550 g of copper sulfate, and 220 g, 220 g, 220 g, and 220 g of sodium hydroxide were used in Examples 25, 26, 27, and 28 respectively. Besides on this, a harmful gas removing agent of Comparative Example 9 was obtained by repeating the steps of Example 3 except that 0 g of manganese sulfate, 600 g of copper sulfate, and 220 g of sodium hydroxide were used. In Examples 25, 26, 27, and 28, a mass ratio of [Mn/(Mn+Cu)] was 1.0, 0.92, 0.67, and 0.08 respectively. In Comparative Example 9, a mass ratio of [Mn/(Mn+Cu)] was 0.0. In Examples 25, 26, 27, and 28, the average manganese oxidation number was 3.75, 3.74, 3.71, and 3.73 respectively.

Performance Evaluation Experiment 5

The $NO_x$ removing ability of the harmful gas removing agents of Examples 3, 4, 5, 25, 26, 27, 28, and Comparative Example 9 was respectively evaluated by repeating the steps of Performance Evaluation Experiment 1. The results are shown in Table 6. As is seen in Table 6, too small mass ratio and too large mass ratio of {Mn/(Mn+Cu)} resulted in deterioration of gas removal ability of the agents.

TABLE 6

| Removing agent | Mn/(Mn + Cu) mass ratio | Average removing rate A of $NO_x$ (%) | Average releasing rate B of $NO_2$ (%) |
|---|---|---|---|
| Example 25 | 1.00 | 74.2 | 1.1 |
| Example 26 | 0.92 | 81.5 | 0.6 |
| Example 3 | 0.80 | 84.7 | 0.7 |
| Example 27 | 0.67 | 83.1 | 1.9 |
| Example 4 | 0.49 | 81.8 | 0.4 |
| Example 5 | 0.19 | 80.4 | 1.1 |
| Example 28 | 0.08 | 70.7 | 0.9 |
| Com. Ex. 9 | 0.00 | 4.3 | 0.2 |

Examples 29, 30, 31 and Comparative Example 10

Harmful gas removing agents of Examples 29, 30, and 31 were respectively obtained by repeating the steps of Example 13, except that 505 g, 425 g, and 25 g of manganese sulfate, 0 g, 110 g, and 650 g of ferrous sulfate, and 300 g, 300 g, and 300 g of sodium carbonate were respectively used. Besides on this, a harmful gas removing agent of Comparative Example 10 was obtained by repeating the steps of Example 13, except that 0 g of manganese sulfate, 680 g of ferrous sulfate, and 300 g of sodium carbonate were used. In Examples 29, 30, and 31, a mass ratio of [Mn/(Mn+Fe)] was 1.0, 0.84, and 0.07,respectively. In Comparative Example 10, a mass ratio of [Mn/(Mn+Fe)] was 0.0. In Examples 29, 30, and 31, the average manganese oxidation number was 3.71, 3.72, and 3.72 respectively.

Performance Evaluation Experiment 6

The $NO_x$ removing ability of the harmful gas removing agents of Examples 13, 14, 15, 29, 30, 31, and Comparative Example 10 respectively was evaluated by repeating the steps of Performance Examination 1. The results are shown in Table 7. As is seen from Table 7, too small mass ratio and too large mass ratio of [Mn/(Mn+Fe)] resulted in deterioration of gas removal ability of the agents.

TABLE 7

| Removing agent | Mn/(Mn + Fe) mass ratio | Average removing rate A of $NO_x$ (%) | Average releasing rate B of $NO_2$ (%) |
| --- | --- | --- | --- |
| Example 29 | 1.00 | 68.8 | 0.4 |
| Example 30 | 0.84 | 78.7 | 1.7 |
| Example 15 | 0.72 | 81.8 | 1.2 |
| Example 13 | 0.32 | 79.6 | 1.1 |
| Example 14 | 0.11 | 75.4 | 0.8 |
| Example 31 | 0.07 | 67.3 | 1.0 |
| Com. Ex. 10 | 0.00 | 2.1 | 0.3 |

Examples 32, 33, 34, 35, 36, 37, and 38

Harmful gas removing agents of Examples 32, 33, 34, 35, and 36 were obtained by repeating the steps of Example 3, except that 0.5 g, 2.0 g, 12.0 g, 18.0 g, and 24.0 g of potassium carbonate were respectively added when the compound oxide, obtained by oxidation in a liquid phase, was kneaded by wet molding before being molded into a shape of tablet.

In Examples 32, 33, 34, 35, and 36, a potassium content was 0.12 mass percent, 0.47 mass percent, 2.9 mass percent, 4.4 mass percent, and 5.7 mass percent respectively.

Besides this, harmful gas removing agents of Examples 37 and 38 were respectively obtained by repeating the steps of Example 3, except that 2.3 g and 9.2 g of sodium carbonate anhydride were respectively added, instead of potassium carbonate. In Examples 37 and 38, a sodium content was 0.58 mass percent and 3.4 mass percent, respectively. The average manganese oxidation numbers was 3.70 in all Examples 32, 33, 34, 35, 36, 37, and 38.

Performance Evaluation Experiment 7

The $NO_x$ removing ability of the harmful gas removing agent of Examples 3 (potassium content: 0.0 mass percent), 11 (potassium content: 0.73 mass percent), 32, 33, 34, 35, 36, 37, and 38 were respectively evaluated by repeating the same steps of Performance Experiment 1, except that a sample gas was passed through at a flow rate of 15.6Nliter/min (space velocity: $60000h^{-1}$). The results are shown in Table 8. As seen in Table 8, although the removing agent of Example 35 had a potassium content converted to potassium almost same as sodium content of the removing agent of Example 38 converted to sodium, the removing agent of example 35 including potassium had more excellent $NO_x$ removing ability than that of Example 38 including sodium.

TABLE 8

| Removing agent | Content of potassium (%) | Average removing rate A of $NO_x$ (%) | Average releasing rate B of $NO_2$ (%) |
| --- | --- | --- | --- |
| Example 3 | 0.00 | 38.3 | 0.6 |
| Example 32 | 0.12 | 40.7 | 1.1 |
| Example 33 | 0.47 | 52.4 | 1.3 |
| Example 11 | 0.73 | 57.6 | 2.1 |
| Example 34 | 2.9 | 60.1 | 0.8 |
| Example 35 | 4.4 | 61.7 | 0.7 |
| Example 36 | 5.7 | 60.4 | 1.1 |
| Example 37 | 0.58* | 52.6 | 1.4 |
| Example 38 | 3.4* | 56.0 | 1.1 |

The mark * indicates the content of sodium.

Performance Evaluation Experiment 8

$NO_x$ removing ability of the harmful gas removing agents of Examples 3, 11, and 12 were respectively evaluated by repeating the steps of Performance Evaluation Experiment 2, except that the sample gas further contained 2.0 ppm of $SO_2$, and the $NO_x$ removing activity and the subsequent regeneration of the agent was repeated five times. The results are shown in Table 9. As is seen in Table 9, in Example 3 using a removing agent containing no tin compound, there was a serious deterioration in the $NO_x$ removing ability. Contrary to this, in Example 12 using a removing agent containing a tin compound, there was only a slight decrease in the $NO_x$ removing ability. From this result, it can be considered that a tin compound and a potassium compound have effect of avoiding a problem of poisoning by $SO_2$.

TABLE 9

| | Removing agent | | | | | |
| --- | --- | --- | --- | --- | --- | --- |
| Times of | Example 3 | | Example 11 | | Example 12 | |
| removal | A (%) | B (%) | A (%) | B (%) | A (%) | B (%) |
| $1^{st}$ | 83.7 | 0.8 | 89.7 | 1.1 | 83.3 | 1.0 |
| $2^{nd}$ | 80.3 | 0.7 | 88.3 | 0.9 | 82.1 | 0.7 |
| $3^{rd}$ | 79.0 | 0.7 | 88.0 | 0.8 | 81.7 | 0.8 |
| $4^{th}$ | 77.3 | 0.4 | 87.6 | 0.6 | 81.0 | 0.5 |
| $5^{th}$ | 74.8 | 0.5 | 86.3 | 0.8 | 80.5 | 0.8 |

Wherein:
A denotes an average removing rate of $NO_x$, B denotes an average releasing rate of $NO_2$.

Example 39

520 g of manganese sulfate ($MnSO_4.5H_2O$) was put into a five-liter beaker, to which two liter of pure water was added, and then, was dissolved with stirring to produce a mother liquor (liquid A). On the other hand, 230 g of sodium hydroxide (NaOH) was added a two-liter beaker containing one liter of pure water, and was dissolved with stirring to produce a precipitant (liquid B). The liquid B was gradually added to the liquid A with stirring to produce a precipitate of manganese hydroxide.

Besides the above, 210 g of ammonium persulfate $[(NH_4)_2S_2O_8]$ was put into a two-liter beaker, to which two liter of pure water was added, and was dissolved with stirring to obtain an ammonium persulfate aqueous solution. Then, the ammonium persulfate aqueous solution was gradually added to the manganese hydroxide precipitate with stirring for 60 minutes to oxidize manganese hydroxide in a liquid phase. As a result, a manganese oxide was obtained. The manganese oxide was repeatedly taken out by filtration and was washed with water to remove impurities therefrom. The resultant was dried and uniformly mixed with alumina sol (#200; product name, manufactured by Nissan Chemical Industries, Ltd.) while adjusting its water content. Then, the resultant was molded into a shape of tablet having a diameter of ¹⁄₁₆ inch by a screw-type extruder, and then, was dried at 110° C. for 20 hours. As a result, a tablet-shaped manganese oxide was obtained.

Next, 1.39 g of ruthenium chloride ($RuCl_3$) was dissolved in pure water to produce a ruthenium chloride aqueous solution. The aqueous solution was sprayed to the tablet-shaped manganese oxide so that the manganese oxide supported ruthenium chloride. The resultant was dried at 110° C. for 20 hours in a drier, and as a result, a harmful gas removing agent was obtained. The removing agent had a composition of 61.9 mass percent of manganese, 0.30 mass percent of ruthenium, and 3.2 mass percent of aluminum. Its specific surface area was 137 $m^2/g$, and its pore volume was 0.41 cc/g. The average manganese oxidation number was 3.72.

Comparative Example 11

A harmful gas removing agent of Comparative Example 11 was produced by repeating the steps of Example 39, except that a ruthenium chloride aqueous solution was not sprayed to the manganese oxide, and therefore, the manganese oxide did not support ruthenium chloride. The average manganese oxidation number was 3.72.

Example 40

A harmful gas removing agent of Example 40 was obtained by repeating the steps of Example 39, except the following. That is, a precipitate of manganese hydroxide was taken out by filtration without adding ammonium persulfate, washed with water to remove impurities therefrom, dried at 110° C. for 20 hours in a drier, and then heated at 300° C. for 4 hours in the air. The resultant was crushed into powder and was uniformly mixed with alumina sol. The harmful gas removing agent had a composition of 64.3 mass percent of manganese, 0.32 mass percent of ruthenium, and 2.9 mass percent of aluminum. Its specific surface area was 94 $m^2/g$, and its pore volume was 0.32 cc/g. The average manganese oxidation number was 3.66.

Comparative Example 12

A harmful gas removing agent of Comparative Example 12 was obtained by repeating the steps of Example 40 except that the precipitate was heated at 300° C. for 4 hours in a nitrogen, instead of in the air. The harmful gas removing agent had a composition of 66.2 mass percent of manganese, 0.31 mass percent of ruthenium, and 2.7 mass percent of aluminum. Its specific surface area was 68 $m^2/g$, and its pore volume was 0.27 cc/g. The average manganese oxidation number was 3.15.

Example 41

A harmful gas removing agent of Example 41 was obtained by repeating the steps of Example 39 except for that 380 g of manganese sulfate and 125 g of copper sulfate ($CuSO_4 \cdot 5H_2O$) was used instead of 520 g of manganese sulfate, thereby obtaining a manganese-copper compound oxide instead of a manganese oxide. The harmful gas removing agent had a composition of 53.9 mass percent of manganese, 13.6 mass percent of copper, 0.29 mass percent of ruthenium, and 2.8 mass percent of aluminum. Its specific surface area was 154 $m^2/g$, and its pore volume was 0.43 cc/g. The average manganese oxidation number was 3.70.

Comparative Example 13

A harmful gas removing agent of Comparative Example 13 was obtained by repeating the steps of Example 41, except that a ruthenium chloride aqueous solution was not sprayed to the tablet-shaped manganese oxide and therefore, the manganese oxide did not support ruthenium chloride. The average manganese oxidation number was 3.70.

Example 42

A harmful gas removing agent of Example 42 was obtained by repeating the steps of Example 39 except for that 135 g of manganese sulfate and 500 g of ferrous sulfate ($FeSO_4 \cdot 7H_2O$) were used instead of 520 g of manganese sulfate, thereby obtaining a manganese-iron compound oxide instead of a manganese oxide. The harmful gas removing agent had a composition of 19.9 mass percent of manganese, 43.5 mass percent of iron, 0.32 mass percent of ruthenium and 2.9 mass percent of aluminum. Its specific surface area was 117 $m^2/g$, and its pore volume was 0.37 cc/g. The average manganese oxidation number was 3.75.

Comparative Example 14

A harmful gas removing agent of Comparative Example 14 was obtained by repeating the steps of Example 42, except that a ruthenium chloride aqueous solution was not sprayed to the tablet-shaped compound oxide, and therefore, the compound oxide did not support ruthenium chloride. The average manganese oxidation number was 3.75.

Example 43

A harmful gas removing agent of Example 43 was obtained by repeating the steps of Example 41, except that 6.0 g of potassium carbonate ($K_2CO_3$) was added together with alumina sol when the compound oxide was molded into a shape of tablet. The harmful gas removing agent had a composition of 52.7 mass percent of manganese, 13.3 mass percent of copper, 0.30 mass percent of ruthenium, 1.57 mass percent of potassium, and 2.9 mass percent of aluminum. Its specific surface area was 146 $m^2/g$, and its pore volume was 0.44 cc/g. The average manganese oxidation number was 3.70.

Example 44

A harmful gas removing agent of Example 44 was obtained by repeating the same steps of Example 41, except that 5.0 g of stannous chloride ($SnCl_2$) was added together with alumina sol when the compound oxide was molded into a shape of tablet. The harmful gas removing agent had a composition of 51.5 mass percent of manganese, 12.7 mass percent of copper, 0.31 mass percent of ruthenium, 0.93 mass percent of tin, and 3.0 mass percent of aluminum. Its specific surface area was 140 $m^2/g$, and its pore volume was 0.39 cc/g. The average manganese oxidation number was 3.70.

Performance Evaluation Experiment 9

The harmful gas removing agents obtained in Examples 39 to 44 and Comparative Examples 11 to 14 were respectively charged in a tube made of stainless steel. The stainless steel tube was equipped with a water-cooled jacket. With this arrangement, CO was removed at a constant temperature. Specifically, the respective harmful gas removing agents were charged in the stainless steel tube in an amount of 32 cm³ (and to a height of 12 cm). Through the respective harmful gas removing agents charged in the tube, passed was a sample gas containing 20 ppm of CO, 20 volume percent of $O_2$, and 80 volume percent of $N_2$ at a flow rate of 5.2Nliter/min (space velocity: $10000h^{-1}$) at a temperature of 35° C. and a relative humidity of 15%. Besides this, the same steps were repeated except for employing a relative humidity of 60%. The concentrations of CO and $CO_2$ were measured at an outlet of the tube using a nondispersive infrared gas analyzer for the respective cases. The CO removing rates for both the cases were obtained from the following calculation:

CO removing rate=($CO_2$ concentration at the outlet of tube/CO concentration at the inlet of tube)×100(%).

The results of calculation are shown in Table 10 where a relative humidity was 15%, while the results obtained in the case where a relative humidity was 60% are shown in Table 11.

TABLE 10

(CO removal, relative humidity: 15%)

| Removing agent | | CO removing rate (%) | | | |
|---|---|---|---|---|---|
| Contained element | Oxidation treatment | 1 h later | 12 h later | 24 h later | 48 h later |
| Example 39 Mn—Ru | Liquid phase | 53 | 45 | 39 | 32 |
| Com. Ex. 11 Mn | Liquid phase | 10 | 6 | 5 | 2 |
| Example 40 Mn—Ru | Gas Phase | 41 | 36 | 28 | 25 |
| Com. Ex. 12 Mn—Ru | None | 13 | 6 | 3 | 1 |
| Example 41 Mn—Cu—Ru | Liquid phase | 83 | 73 | 67 | 62 |
| Com. Ex. 13 Mn—Cu | Liquid phase | 20 | 15 | 11 | 9 |
| Example 42 Mn—Fe—Ru | Liquid phase | 78 | 66 | 60 | 52 |
| Com. Ex. 14 Mn—Fe | Liquid phase | 13 | 11 | 10 | 6 |
| Example 43 Mn—Cu—K—Ru | Liquid phase | 86 | 75 | 71 | 66 |
| Example 44 Mn—Cu—Sn—Ru | Liquid phase | 82 | 70 | 68 | 65 |

TABLE 11

(CO removal, relative humidity: 60%)

| Removing agent | | CO removing rate (%) | | | |
|---|---|---|---|---|---|
| Contained element | Oxidation treatment | 1 h later | 12 h later | 24 h later | 48 h later |
| Example 39 Mn—Ru | Liquid phase | 32 | 25 | 21 | 16 |
| Com. Ex. 11 Mn | Liquid phase | 5 | 1 | 0 | 0 |
| Example 40 Mn—Ru | Gas Phase | 27 | 22 | 19 | 13 |
| Com. Ex. 12 Mn—Ru | None | 7 | 3 | 1 | 0 |
| Example 41 Mn—Cu—Ru | Liquid phase | 64 | 45 | 39 | 31 |
| Com. Ex. 13 Mn—Cu | Liquid phase | 11 | 5 | 2 | 0 |
| Example 42 Mn—Fe—Ru | Liquid phase | 51 | 37 | 30 | 24 |
| Com. Ex. 14 Mn—Fe | Liquid phase | 7 | 3 | 1 | 1 |
| Example 43 Mn—Cu—K—Ru | Liquid phase | 63 | 51 | 44 | 39 |
| Example 44 Mn—Cu—Sn—Ru | Liquid phase | 66 | 48 | 42 | 36 |

Performance Evaluation Experiment 10

The harmful gas removing agents obtained in Examples 39 to 44 and Comparative Examples 11 to 14 were respectively charged in the same type of tubes as those used in Performance Evaluation Experiment 9. Specifically, the respective harmful gas removing agents were charged in the stainless steel tube in an amount of 5.3 cm³ (and to a height of 2 cm). Through the respective harmful gas removing agents charged in the tube, passed was a sample gas containing 10 ppm of $O_3$ with the balance of the air at a flow rate of 5.2Nliter/min (space velocity: $60000h^{-1}$) at a temperature of 35° C. and a relative humidity of 15%. Besides this, the same steps were repeated except for employing a humidity of 60%. The concentration of $O_3$ was measured at an outlet of the tube using a ultraviolet adsorption analyzer for the respect cases. The $O_3$ removing rates for both the cases were obtained from the following calculation:

$O_3$ removing rate=(1- $O_3$ concentration at the outlet of tube/$O_3$ concentration at the inlet of tube)×100(%).

The results of calculation are shown in Table 12 where relative humidity was 15%, while the results obtained in the case where relative humidity was 60% are shown in Table 13.

TABLE 12

($O_3$ removal, relative humidity: 15%)

| Removing agent | | CO removing rate (%) | | | |
|---|---|---|---|---|---|
| Contained element | Oxidation treatment | 1 h later | 12 h later | 24 h later | 48 h later |
| Example 39 Mn—Ru | Liquid phase | 99 | 93 | 91 | 88 |
| Com. Ex. 11 Mn | Liquid phase | 53 | 42 | 38 | 37 |
| Example 40 Mn—Ru | Gas Phase | 98 | 90 | 86 | 81 |
| Com. Ex. 12 Mn—Ru | None | 60 | 51 | 43 | 37 |
| Example 41 Mn—Cu—Ru | Liquid phase | 100 | 97 | 96 | 94 |
| Com. Ex. 13 Mn—Cu | Liquid phase | 93 | 86 | 83 | 81 |
| Example 42 Mn—Fe—Ru | Liquid phase | 100 | 100 | 99 | 98 |
| Com. Ex. 14 Mn—Fe | Liquid phase | 99 | 91 | 85 | 83 |
| Example 43 Mn-Cu—K—Ru | Liquid phase | 100 | 99 | 99 | 97 |
| Example 44 Mn—Cu—Sn—Ru | Liquid phase | 99 | 99 | 97 | 96 |

TABLE 13

($O_3$ removal, relative humidity: 60%)

| Removing agent | | | CO removing rate (%) | | | |
|---|---|---|---|---|---|---|
| | Contained element | Oxidation treatment | 1 h later | 12 h later | 24 h later | 48 h later |
| Example 39 | Mn—Ru | Liquid phase | 93 | 82 | 77 | 72 |
| Com. Ex. 11 | Mn | Liquid phase | 41 | 35 | 30 | 26 |
| Example 40 | Mn—Ru | Gas Phase | 94 | 80 | 77 | 69 |
| Com. Ex. 12 | Mn—Ru | None | 37 | 33 | 28 | 24 |
| Example 41 | Mn—Cu—Ru | Liquid phase | 99 | 86 | 83 | 81 |
| Com. Ex. 13 | Mn—Cu | Liquid phase | 87 | 79 | 77 | 73 |
| Example 42 | Mn—Fe—Ru | Liquid phase | 98 | 94 | 93 | 90 |
| Com. Ex. 14 | Mn—Fe | Liquid phase | 93 | 81 | 77 | 72 |
| Example 43 | Mn—Cu—K—Ru | Liquid phase | 99 | 91 | 90 | 87 |
| Example 44 | Mn—Cu—Sn—Ru | Liquid phase | 98 | 88 | 87 | 84 |

Comparative Examples 15 and 16, and Examples 45, 46, and 47

Harmful gas removing agents of Comparative Examples 15 and 16 were obtained by repeating the steps of Example 39, except for using ammonium persulfate of 42 g and 84 g respectively. Besides this, harmful gas removing agents of Examples 45, 46, and 47 were obtained by repeating the steps of Example 39, except for using ammonium persulfate of 126 g, 168 g, and 336 g, respectively. In Comparative Examples 15 and 16, the average manganese oxidation number was 3.33 and 3.44 respectively. In Examples 45, 46, and 47, the average manganese oxidation number was 3.52, 3.59, and 3.81 respectively. As has been described above, in Example 39, the average manganese oxidation number was 3.72.

Performance Evaluation Experiment 11

The CO removing (oxidizing) ability of the harmful gas removing agents of Comparative Examples 15 and 16, and those of Examples 39, 45, 46, and 47 at a relative humidity of 15% were respectively evaluated by repeating the steps of Performance Evaluation Experiment 9. The changes in CO removing rate with the elapse of time thereof are shown in Table 14.

TABLE 14

CO removal, relative humidity: 15%,
influence by manganese oxidation number

| Removing agent | Manganese oxidation number | CO removing rate (%) | | | |
|---|---|---|---|---|---|
| | | 1 h later | 12 h later | 24 h later | 48 h later |
| Com.Ex15 | +3.33 | 26 | 20 | 14 | 10 |
| Com.Ex.16 | +3.44 | 27 | 21 | 14 | 10 |
| Example 45 | +3.52 | 40 | 33 | 26 | 22 |
| Example 46 | +3.59 | 48 | 39 | 34 | 30 |
| Example 39 | +3.72 | 53 | 45 | 39 | 32 |
| Example 47 | +3.81 | 52 | 43 | 36 | 31 |

Performance Evaluation Experiment 12

The $O_3$ removing (decomposing) ability of the harmful gas removing agents of Comparative Examples 15 and 16, and those of Examples 39, 45, 46, and 47 at a relative humidity of 15% were respectively evaluated by repeating the steps of Performance Evaluation Experiment 10. The changes in $O_3$ removing rate with the elapse of time are shown in Table 15.

TABLE 15

$O_3$ removal, relative humidity: 15%,
influence by manganese oxidation number

| Removing agent | Manganese oxidation number | $O_3$ removing rate (%) | | | |
|---|---|---|---|---|---|
| | | 1 h later | 12 h later | 24 h later | 48 h later |
| Com.Ex15 | +3.33 | 82 | 70 | 67 | 59 |
| Com.Ex.16 | +3.44 | 84 | 75 | 68 | 62 |
| Example 45 | +3.52 | 93 | 87 | 83 | 78 |
| Example 46 | +3.59 | 97 | 90 | 88 | 87 |
| Example 39 | +3.72 | 99 | 93 | 91 | 88 |
| Example 47 | +3.81 | 99 | 95 | 92 | 89 |

Example 48

A harmful gas removing agent of Example 48 was obtained by repeating the steps of Example 41 except for that instead of 380 g of manganese sulfate and 125 g of copper sulfate, 380 g of manganese sulfate was oxidized in a liquid phase, and the resultant precipitate was taken out by filtration, washed with water, dried and then crushed into powder by a ball mill. In addition, this step was repeated for obtaining a powered copper sulfate except that 125 g of copper sulfate was used in stead of 380 g of manganese sulfate. Then, as was conducted in Example 42, the powdered manganese oxide and the powdered copper oxide were mixed with each other by a kneader in such a manner that the mass ratio therebetween became the same value as that used in Example 41 converted to manganese and copper. Subsequently, repeating the steps of Example 41, the kneaded product was molded into a shape of tablet having a diameter of ⅛ inch, and a ruthenium chloride aqueous solution was sprayed thereto so that the molded product supported ruthenium chloride. As a result, a harmful gas removing agent was obtained. The harmful gas removing agent of Example 48 was different from that of Example 41 in that the removing agent of Example 48 included a mere mixture of a manganese oxide and a copper oxide, whereas the removing agent of Example 41 included a manganese-copper compound oxide. The harmful gas removing agent of Example 48 had a composition of 54.2 mass percent of manganese, 13.7 mass percent of copper, 0.30 mass percent of ruthenium, and 2.7 mass percent of aluminum. Its specific surface area was 146 m$^2$/g, and its pore volume was 0.45 cc/g. The average manganese oxidation number was 3.74.

Performance Evaluation Experiment 13

The CO removing (oxidizing) ability of the harmful gas removing agent of Example 48 was evaluated by repeating the steps of Performance Evaluation Experiment 9 at a relative humidity of 15%. The changes in CO removing rate are shown in Table 16.

TABLE 16

CO removal, relative humidity: 15%,
influence by compound oxide

| Removing agent | Manganese oxidation number | 1 h later | 12 h later | 24 h later | 48 h later |
|---|---|---|---|---|---|
| Example 48 | +3.74 (oxide is mixed) | 47 | 41 | 33 | 25 |
| Example 41 | +3.70 (compound oxide) | 83 | 73 | 67 | 62 |

Performance Evaluation Experiment 14

The $O_3$ removing (decomposing) ability of the harmful gas removing agent of Example 48 was evaluated by repeating the steps of Performance Evaluation Experiment 10 at a relative humidity of 15%. The changes in $O_3$ removing rate are shown in Table 17.

TABLE 17

$O_3$ removal, relative humidity: 15%,
influence by compound oxide

| Removing agent | Manganese oxidation number | 1 h later | 12 h later | 24 h later | 48 h later |
|---|---|---|---|---|---|
| Example 48 | +3.74 (oxide is mixed) | 90 | 75 | 68 | 61 |
| Example 41 | +3.70 (compound oxide) | 100 | 97 | 96 | 94 |

Examples 49, 50, 51, 52, 53, and 54

Harmful gas removing agents of Examples 49, 50, 51, 52, 53, and 54 were obtained by repeating the steps of Example 43, except that 0.5 g, 2.0 g, 3.0 g, 12.0 g, 18.0 g, and 24.0 g of potassium carbonate was added to the compound oxide when the compound oxide, obtained by oxidation in a liquid phase, was molded into a shape of tablet. The removing agent respectively had potassium content of 0.12 mass percent, 0.47 mass percent, 0.73 mass percent, 2.89 mass percent, 4.41 mass percent, and 5.70 mass percent in this order. The average manganese oxidation number was 3.70 in all Examples 49, 50, 51, 52, 53, and 54.

Performance Evaluation Experiment 15

The CO removing (oxidizing) ability of the respective harmful gas removing agents of Examples 41 (potassium content: 0.0 mass percent), 43 (potassium content: 1.57 mass percent), 49, 50, 51, 52, 53, and 54 was evaluated by repeating the steps of Performance Evaluation Experiment 9 at a relative humidity of 15%, except that flow rate of the sample gas was 15.6Nliter/min (space velocity: 30000h$^{-1}$). The changes in CO removing rate with the elapse of time are shown in Table 18.

TABLE 18

CO removal, relative humidity: 15%,
showing an effect of supporting potassium

| Removing agent | Content of potassium (mass %) | 0.5 hr later | 4 hr later | 8 hr later | 16 hr later |
|---|---|---|---|---|---|
| Example 41 | 0.00 | 42 | 33 | 27 | 23 |
| Example 49 | 0.12 | 40 | 34 | 31 | 26 |
| Example 50 | 0.47 | 47 | 40 | 36 | 33 |
| Example 51 | 0.73 | 56 | 48 | 43 | 42 |
| Example 43 | 1.57 | 64 | 55 | 50 | 47 |
| Example 52 | 2.89 | 69 | 62 | 54 | 51 |
| Example 53 | 4.41 | 68 | 60 | 55 | 53 |
| Example 54 | 5.70 | 66 | 62 | 56 | 55 |

Performance Evaluation Experiment 16

The $O_3$ removing (decomposing) ability of the harmful gas removing agents of Examples 41, 43, 49, 50, 51, 52, 53, and 54 at a relative humidity of 15% was evaluated by repeating the steps of Performance Evaluation Experiment 10, except that the flow rate of the sample gas was 15.6Nliter/min (space velocity: 180000h$^{-1}$). The changes in $O_3$ removing rate are shown in Table 19.

TABLE 19

$O_3$ removal, relative humidity: 15%,
effect of supporting potassium

| Removing agent | Content of potassium (mass %) | 0.5 hr later | 4 hr later | 8 hr later | 16 hr later |
|---|---|---|---|---|---|
| Example 41 | 0.00 | 67 | 61 | 57 | 52 |
| Example 49 | 0.12 | 69 | 62 | 60 | 56 |
| Example 50 | 0.47 | 77 | 72 | 68 | 60 |
| Example 51 | 0.73 | 85 | 75 | 71 | 64 |
| Example 43 | 1.57 | 88 | 81 | 75 | 72 |
| Example 52 | 2.89 | 90 | 82 | 77 | 74 |
| Example 53 | 4.41 | 93 | 86 | 80 | 75 |
| Example 54 | 5.70 | 94 | 85 | 81 | 76 |

Performance Evaluation Experiment 17

The CO removing (oxidizing) ability of the harmful gas removing agents of Examples 41 and 44 at a relative humidity of 15% was evaluated by repeating the steps of Performance Evaluation Experiment 9, except that the sample gas further contained 5 ppm of $SO_2$. In Performance Evaluation Experiment 17, the reaction was conducted for longer time than Performance Evaluation Experiment 9. The changes in CO removing rate are shown in Table 20.

TABLE 20

(CO removal from $SO_2$-containing gas,
relative humidity: 15%, effect of supporting tin)

| Removing agent | Presence of tin | 1 h later | 12 h later | 24 h later | 48 h later | 72 h later | 96 h later |
|---|---|---|---|---|---|---|---|
| Example 41 | No | 82 | 70 | 63 | 55 | 43 | 37 |
| Example 44 | Yes | 82 | 71 | 66 | 62 | 57 | 50 |

Performance Evaluation Experiment 18

The $O_3$ removing (oxidizing) ability of the harmful gas removing agents of Examples 41 and 44 at a relative humidity of 15% was evaluated by repeating the steps of Performance Evaluation Experiment 10, except that the sample gas further contained 2.5 ppm of $SO_2$. In Performance Evaluation Experiment 18, the reaction was conducted for longer time than Performance Evaluation Experiment 10. The changes in $O_3$ removing rate are shown in Table 21.

TABLE 21

($O_3$ removal from $SO_2$-containing gas, relative humidity: 15%, effect of supporting tin)

| Removing agent | Presence of tin | CO removing rate (%) | | | | | |
|---|---|---|---|---|---|---|---|
| | | 1 h later | 12 h later | 24 h later | 48 h later | 72 h later | 96 h later |
| Example 41 | No | 98 | 96 | 92 | 88 | 81 | 69 |
| Example 44 | Yes | 97 | 97 | 95 | 91 | 88 | 82 |

Example 55

A harmful gas removing agent of Example 55 was obtained by repeating the steps of Example 3 except for that to the compound oxide after washed with water and dried, the same ruthenium chloride solution as that of Example 1 was added together with alumina sol. A ruthenium chloride aqueous solution was not sprayed to the tablet-shaped compound oxide. The harmful gas removing agent of Example 55 had a composition of 53.7 mass percent of manganese, 13.5 mass percent of copper, 0.30 mass percent of ruthenium, and 2.8 mass percent of aluminum. Its specific surface area was 158 $m^2/g$, and its pore volume was 0.45 cc/g. The average manganese oxidation number was 3.70.

Comparative Example 17

A harmful gas removing agent of Comparative Example 17 was obtained by repeating the steps of Example 55 except for that to the compound oxide after washed with water and dried, powdered metal ruthenium obtained by reducing ruthenium oxide in hydrogen airflow was added together with alumina sol. Then, the resultant was molded into a shape of tablet. The harmful gas removing agent included 0.32 mass percent of ruthenium, and the average manganese oxidation number was 3.70.

Performance Evaluation Experiment 19

The $NO_x$ removing ability of the harmful gas removing agents of Example 55, Comparative Examples 4 and 17 was respectively evaluated by repeating the steps of Performance Evaluation Experiment 1. The results are shown in Table 22.

As is seen in Table 22, the removing agent of Comparative Example 17 in which metal ruthenium was supported had almost same $NO_x$ ability as that of the removing agents of Comparative Example 4 in which no ruthenium or ruthenium compound was supported. Contrary to this, the removing agent of Example 55 in which ruthenium chloride was supported on a same metal basis as Comparative Example 17 had remarkably enhanced $NO_x$ ability, and also exhibited decreased $NO_2$ releasing rate.

TABLE 22

| Removing agent | Removing rate of $NO_x$ (%) | Releasing rate of $NO_2$ (%) |
|---|---|---|
| Example 55 (ruthenium chloride is kneaded and supported) | 66.0 | 1.1 |
| Com. Example 17 (metallic ruthenium is kneaded and supported) | 11.7 | 22.9 |
| Com. Example 4 (no supporting) | 9.3 | 24.0 |

INDUSTRIAL APPLICABILITY

The harmful gas removing agent is capable of removing harmful gas including $NO_x$ such as NO and $NO_2$, CO, and $O_3$ from exhaust gases having normal temperature ventilated from automobile tunnels and underground parking. The harmful gas removing agent is especially advantageous in removing $NO_x$ such as NO and $NO_2$, because there is no need to add $O_3$ to the exhaust gas prior to its treatment, and therefore, there is no need of providing an $O_3$ producing device or a device for removing excessive $O_3$ to the exhaust gas treatment apparatus, and there is no fear of $O_3$ leakage. The harmful gas removing agent can be regenerated by being exposed to hot air at relatively low temperature, thereby being repeatedly used, and also is hard to be poisoned by $SO_x$ contained in the exhaust gas being treated. Therefore, the harmful gas removing agent performs excellent and stable removing activity for a long period of time.

The harmful gas removing agent is also advantageous in removing CO and $O_3$ contained in exhaust gases having normal temperature even at high humidity, and its removing activity lasts for a long period of time. In the treatment for CO and $O_3$, CO is oxidized into $CO_2$ and $O_3$ is decomposed into $O_2$. There is no serious deterioration in its removing ability even at high humidity, unlike the conventional agents. With such characteristics, the removing agent is applicable to wider applications and is hard to be poisoned by $SO_x$.

We claim:

1. A harmful gas removing agent comprising:
   a manganese-copper compound oxide and/or a manganese-iron compound oxide; and
   a ruthenium compound supported on said oxide.

2. A harmful gas removing agent according to claim 1, wherein the manganese-copper compound oxide has a mass ratio of [Mn/(Mn+Cu)] of 0.15 or more, and the manganese-iron compound oxide has a mass ratio of [Mn/Mn+Fe] of 0.1 or more.

3. A harmful gas removing agent according to claim 2, wherein the manganese-copper compound oxide has a mass ratio of [Mn/(Mn+Cu)] of 0.45 to 0.95, and the manganese-iron compound oxide has a mass ratio of [Mn/(Mn+Fe)] of 0.3 to 0.85.

4. A harmful gas removing agent according to claim 2, wherein the manganese-copper compound oxide and/or the manganese-iron compound oxide has an average manganese oxidation number of 3.5 to 3.8.

5. A harmful gas removing agent according to claim 1, wherein the manganese-copper compound oxide and the manganese-iron compound oxide has a specific surface area of 70 $m^2/g$ or more.

6. A harmful gas removing agent according to claim 1, wherein the manganese-copper compound oxide and/or the manganese-iron compound oxide has an average manganese oxidation number of 3.5 to 3.9.

7. A harmful gas removing agent comprising:
at least one oxide selected from the group consisting of a manganese oxide, a manganese-copper compound oxide, and a manganese-iron compound oxide;
a ruthenium compound and
an alkali metal compound both supported on said oxide
wherein the manganese oxide, the manganese-copper compound oxide, and the manganese-iron compound oxide respectively have an average manganese oxidation number of 3.5 to 3.9.

8. A harmful gas removing agent according to claim 7, wherein the alkali metal compound is a potassium compound.

9. A harmful gas removing agent according to claim 7, wherein the alkali metal compound is contained at 0.1 to 6.0 mass percent, the alkali metal compound being based on the alkali metal.

10. A harmful gas removing agent comprising:
at least one oxide selected from the group consisting of a manganese oxide, a manganese-copper compound oxide, and a manganese-iron compound oxide;
a ruthenium compound and
a tin compound both supported on said oxide
wherein the manganese oxide, the manganese-copper compound oxide, and the manganese-iron compound oxide respectively have an average manganese oxidation number of 3.5 to 3.9.

11. A harmful gas removing agent according to claim 10, wherein the tin compound is contained at 0.05 to 5.0 mass percent, the tin compound being based on the tin metal.

12. A harmful gas removing agent according to claim 1, 7, or 10, wherein the manganese-copper compound oxide is produced by oxidizing hydroxide or carbonate of manganese with hydroxide or carbonate of copper in an oxidation condition, and the manganese-iron compound oxide is produced by oxidizing hydroxide or carbonate of manganese with hydroxide or carbonate of iron in an oxidation condition.

13. A harmful gas removing agent comprising:
a manganese oxide having an average manganese oxidation number of 3.5 to 3.9; and
a ruthenium compound supported on said oxide.

14. A harmful gas removing agent according to claim 13, wherein the manganese oxide has a specific surface area of 70 $m^2$/g.

15. A harmful gas removing agent according to claim 13, wherein the manganese oxide has an average manganese oxidation number of 3.5 to 3.8.

16. A harmful gas removing agent according to claim 1, 7, 10, or 13, wherein the ruthenium compound is ruthenium chloride.

17. A harmful gas removing agent according to claim 7, 10, or 13, wherein the manganese oxide is produced by oxidizing hydroxide or carbonate of manganese in an oxidation condition.

18. A harmful gas removing agent according to claim 1, 7, 10 or 13, wherein the harmful gas is an exhaust gas comprising at least one member selected from the group consisting of nitrogen oxides, CO and $O_3$.

* * * * *

UNITED STATES PATENT AND TRADEMARK OFFICE
CERTIFICATE OF CORRECTION

PATENT NO. : 6,066,590

DATED : May 23, 2000

INVENTOR(S): Yuji HORII, et al.

It is certified that an error appears in the above-identified patent and that said Letters Patent is hereby corrected as shown below:

On the Title page, Item [ 73 ], the Assignee information is listed incorrectly. Item [ 73 ] should read as follows:

--- [73]  Assignees: Kabushiki Kaisha Kobe Seiko Sho, Kobe;
             Sued-Chemie Nissan Catalysts Inc., Tokyo-to,
             both of Japan                                ---

Signed and Sealed this

Sixth Day of March, 2001

Attest:

NICHOLAS P. GODICI

*Attesting Officer*      *Acting Director of the United States Patent and Trademark Office*